US008228301B2

(12) United States Patent
Schneider

(10) Patent No.: US 8,228,301 B2
(45) Date of Patent: Jul. 24, 2012

(54) MULTIPLE COLOR WRITING TABLET

(75) Inventor: Tod L. Schneider, Kent, OH (US)

(73) Assignee: Kent Displays Incorporated, Kent, OH (US)

( * ) Notice: Subject to any disclaimer, the term of this patent is extended or adjusted under 35 U.S.C. 154(b) by 1011 days.

(21) Appl. No.: 12/152,729

(22) Filed: May 16, 2008

(65) Prior Publication Data
US 2009/0033811 A1 Feb. 5, 2009

Related U.S. Application Data

(60) Provisional application No. 60/962,625, filed on Jul. 31, 2007.

(51) Int. Cl.
G09G 3/36 (2006.01)
G09G 5/00 (2006.01)
G06F 3/041 (2006.01)
G02F 1/1335 (2006.01)

(52) U.S. Cl. .......... 345/173; 345/87; 345/104; 345/156; 349/12

(58) Field of Classification Search .......... 345/4–6, 345/87–104, 204–215, 690–699, 156–184; 349/12, 115, 168, 175, 185
See application file for complete search history.

(56) References Cited

U.S. PATENT DOCUMENTS

| 4,525,032 A | 6/1985 | Hilsum |
| 5,453,863 A | 9/1995 | West et al. |
| 5,594,562 A | 1/1997 | Sato et al. |
| 5,691,795 A | 11/1997 | Doane et al. |
| 5,847,798 A | 12/1998 | Yang et al. |

(Continued)

FOREIGN PATENT DOCUMENTS

JP 05053537 3/1993

(Continued)

OTHER PUBLICATIONS

"Etch a Sketch Animator 2000"; http://en.wikipedia.org/wiki/Etch_A_Sketch.

(Continued)

Primary Examiner — Alexander Eisen
Assistant Examiner — Patrick F Marinelli
(74) Attorney, Agent, or Firm — Pearne & Gordon LLP

(57) ABSTRACT

One aspect of the invention is a bistable cholesteric writing tablet on which an image is formed by applying a suitable voltage while applying writing pressure, which results in a focal conic texture in a reduced gap region of the active layer while not changing the texture of the unreduced gap region of the active layer (e.g., a written portion being in a focal conic texture on a background in the planar texture). Another aspect of the invention is a multi-color stacked writing tablet in which a color of an image is selected by applying a suitable voltage while applying writing pressure using an instrument such as an untethered stylus on the surface of the tablet. The writing tablet includes at least two or three stacked layers of bistable cholesteric liquid crystal material. Selected colors can be additively mixed to achieve intermediate colors as desired. The image can be erased and new images written on the tablet. Gray scale achieved by varying the applied voltage during writing or the writing pressure in some cases, enables the writing tablet to produce a broad range of colors. The writing device is suitable for many applications such as a toy, sketch pad, erasable signage, tags or a large writing board without the mess of chalk or ink.

35 Claims, 9 Drawing Sheets

U.S. PATENT DOCUMENTS

| | | | |
|---|---|---|---|
| 6,104,448 A * | 8/2000 | Doane et al. | 349/12 |
| 6,268,839 B1 | 7/2001 | Yang et al. | |
| 6,377,321 B1 | 4/2002 | Khan et al. | |
| 6,473,072 B1 | 10/2002 | Comiskey et al. | |
| 6,639,578 B1 | 10/2003 | Comiskey et al. | |
| 6,654,080 B1 | 11/2003 | Khan et al. | |
| 6,697,039 B1 | 2/2004 | Yamakawa et al. | |
| 6,730,862 B1 | 5/2004 | Gasparik | |
| 6,753,933 B2 | 6/2004 | Cirkel et al. | |
| 6,759,399 B1 | 7/2004 | Petit et al. | |
| 6,811,815 B2 | 11/2004 | He et al. | |
| 6,825,829 B1 | 11/2004 | Albert et al. | |
| 6,842,210 B2 | 1/2005 | Hashimoto et al. | |
| 6,999,061 B2 | 2/2006 | Hara et al. | |
| 7,061,559 B2 | 6/2006 | Khan et al. | |
| 7,132,064 B2 | 11/2006 | Li et al. | |
| 7,136,048 B2 | 11/2006 | Yrjanainen et al. | |
| 7,170,481 B2 * | 1/2007 | Doane et al. | 345/87 |
| 7,190,337 B2 * | 3/2007 | Miller et al. | 345/87 |
| 7,242,394 B2 | 7/2007 | Lahade et al. | |
| 7,245,483 B2 | 7/2007 | Feague et al. | |
| 7,351,506 B2 | 4/2008 | Schneider et al. | |
| 7,385,656 B2 | 6/2008 | Nose et al. | |
| 7,746,430 B2 | 6/2010 | Kurosaki et al. | |
| 2003/0058227 A1 | 3/2003 | Hara et al. | |
| 2003/0071754 A1 | 4/2003 | McEwan | |
| 2003/0137496 A1 | 7/2003 | Stevens et al. | |
| 2003/0156099 A1 * | 8/2003 | Yrjanainen et al. | 345/173 |
| 2003/0156243 A1 | 8/2003 | Yoshihara et al. | |
| 2004/0140964 A1 | 7/2004 | Wang et al. | |
| 2004/0145691 A1 | 7/2004 | Kubota et al. | |
| 2004/0159702 A1 | 8/2004 | Rosenfeld | |
| 2004/0207606 A1 | 10/2004 | Atwood et al. | |
| 2004/0263486 A1 | 12/2004 | Seni | |
| 2005/0079386 A1 | 4/2005 | Brown, Jr. et al. | |
| 2005/0104806 A1 | 5/2005 | Stephenson, III | |
| 2006/0017708 A1 * | 1/2006 | Fukui et al. | 345/173 |
| 2006/0151601 A1 | 7/2006 | Rosenfeld | |
| 2006/0204675 A1 | 9/2006 | Gao et al. | |
| 2006/0262235 A1 | 11/2006 | Vogels et al. | |
| 2006/0267955 A1 | 11/2006 | Hino | |
| 2007/0026163 A1 | 2/2007 | Schneider et al. | |
| 2007/0059901 A1 | 3/2007 | Majumdar et al. | |
| 2007/0063939 A1 | 3/2007 | Bellamy | |
| 2007/0085837 A1 * | 4/2007 | Ricks et al. | 345/173 |
| 2007/0237906 A1 | 10/2007 | Li et al. | |
| 2007/0238080 A1 | 10/2007 | Lynch | |
| 2007/0277659 A1 | 12/2007 | Schneider et al. | |
| 2007/0285385 A1 | 12/2007 | Albert et al. | |
| 2008/0309598 A1 | 12/2008 | Doane et al. | |
| 2009/0096942 A1 | 4/2009 | Schneider et al. | |

FOREIGN PATENT DOCUMENTS

| | | |
|---|---|---|
| JP | 08035759 | 2/1996 |
| JP | 2001125108 | 5/2001 |
| JP | 2001334693 | 12/2001 |
| JP | 2002163070 | 6/2002 |
| JP | 2004331697 | 11/2004 |

OTHER PUBLICATIONS

"Interactive Whiteboard"; http://www.alibaba.com/product-gs/212710367/Interactive_Whiteboard.html.

"Smartboard Polycom IVC"; http://dl.austincc.edu/ivc/equipment/smartboardh323.htm.

"Dry Erase Presentation Boards"; http://speakeasydryerase.com/files/specifications/SelfAdhesiveSpec.pdf.

"How Magna Doodle Works"; http://entertainment.howstuffworks.com/magna-doodle.htm.

International Search Report for Appl. No. PCT/US2010/036175.

International Search Report for Appl. No. PCT/US2010/036175 dated Dec. 23, 2010.

Notice of Allowance issued on Feb. 16, 2012 from U.S. Appl. No. 12/217,158, filed Jul. 1, 2008.

Office action dated Jun. 24, 2011 from U.S. Appl. No. 11/762,174, filed Jun. 13, 2007.

Final Office action dated Jan. 19, 2012 from U.S. Appl. No. 11/762,174, filed Jun. 13, 2007.

* cited by examiner

MULTIPLE COLOR WRITING TABLET

FIELD OF THE INVENTION

This relates to the field of writing tablets and to color writing tablets in particular.

BACKGROUND OF INVENTION

We are accustomed to writing, drawing or painting in different colors on paper, cloth, or other surfaces using crayons, paints, inks, colored chalk, or colored pencils to cite a few examples. Using more modern technology brought on by touch screens and powerful software, we can write on computer screens and make different color images. However, we have not had the privilege of a simple writing pad that imitates paper, devoid of complex electronics and software to hand write or draw images in a multitude of different colors with an untethered stylus such as a pencil or ink pen. Commercial devices such as the Etch A Sketch or the Magna Doodle have not offered multicolor capability.

A considerable improvement on writing pads was made with the discovery of bistable cholesteric liquid crystals (see U.S. Pat. No. 5,453,863) that could be switched by low voltage DC pulses by changing the magnitude of the pulse rather than the frequency. Furthermore, it was discovered that the pressure of a stylus could be used to write a planar line on a focal conic bistable cholesteric layer (see U.S. Pat. No. 6,104,448) that could then be erased with a low voltage DC pulse. There were found to be many other advantages of the bistable materials in that an image created on the writing pad display did not degrade with time and would last indefinitely until erased. The erasure time was found to be less than a second making the bistable cholesteric liquid crystal display a substantially more practical device for a writing pad but with limitations as will be described later.

Cholesteric liquid crystalline materials are unique in their optical and electro-optical features. They can be tailored to Bragg reflect light at a pre-selected wavelength and bandwidth, as these materials possess a helical structure in which the liquid crystal (LC) director twists around a helical axis. The reflected light is circularly polarized with the same handedness as the helical structure of the LC. If the incident light is not polarized, it will be decomposed into two circular polarized components with opposite handedness and one of the components reflected.

The cholesteric material is typically electrically switched to either one of two stable textures; planar or focal conic as described, for example in U.S. Pat. No. 5,453,863. In the planar texture, the director of the LC is uniformly parallel to the plane of the substrates across the cell but has a helical twist perpendicular to the plane of the substrates. It is the helical twist of the uniform planar texture that Bragg reflects light in a selected wavelength band. The focal conic texture contains defects that perturb the orientation of the liquid crystalline helices. In the typical focal conic texture, the defect density is high; thus the helical domain size becomes small and randomized in orientation such that it is just forward scattering and does not reflect impinging light. Once the defect structures are created, they are topologically stable and cannot be removed unless by some external force such as an electric field. Thus, the focal conic texture remains stable and forward scatters light of all wavelengths into an absorbing (usually black) background. These bistable structures can be electronically switched between each other at rapid rates (on the order of milliseconds). Gray scale is also available through various switching schemes in order to adjust the density of reflective helical domains that are oriented perpendicular to the substrates (planar texture) relative to the randomized forward scattering domains (focal conic texture).

Bistable cholesteric liquid crystal displays have several important electronic drive features that other bistable reflective technologies do not. Of extreme importance for addressing a matrix of many pixels in a display is the characteristic of a voltage threshold. A threshold is used for multiplexing a row/column matrix without the need of an expensive active matrix (transistor at each pixel). Bistability with a voltage threshold allows very high-resolution displays to be produced with low-cost passive matrix technology. Gray scale capability allows stacked red, green blue, high-resolution displays with full-color capability where as many as 4096 colors have been demonstrated.

In a cholesteric liquid crystal display, the liquid crystal is typically sandwiched between two substrates that are spaced to a particular gap. The substrates can be either glass or plastic. The bottom substrate is painted with a light absorbing (black or colored) back layer. The cell gap is usually set by plastic or glass spacers that are either cylindrical or spherical in shape. However, when one presses on the top substrate, the liquid crystal is displaced (since fluids are not very compressible) and induced to flow laterally out of the area. Of principle interest is that when the focal conic texture of the liquid crystal is induced to flow, the resulting texture is the planar state. The reflective planar state contrasts well with the dark focal conic background. This is a principle behind U.S. Pat. No. 6,104,448 "Pressure Sensitive Liquid Crystalline Light Modulating Device and Material" which discloses that application of a mechanical stress to the liquid crystalline light modulating material changes an initial light scattering focal conic texture to the light reflecting planar texture. The U.S. Pat. No. 6,104,448 discloses a polymer network that is soluble with the chiral nematic liquid crystal and phase separates to form separated polymer domains. The patent states that the polymer network is distributed in phase separated domains in the cell in an amount that stabilizes the thickness of the structure of the cell. Writing tablets of the prior art are made of a single liquid crystal layer with flexible plastic substrates. Pressure with a stylus draws a monochromatic color image which is the reflective color of the cholesteric planar texture on a black or contrasting color background. The image is erased by applying a voltage pulse to electrodes on the cell that drives the entire cell to the focal conic state.

SUMMARY

In this invention we disclose a different type of cholesteric writing pad in which a color of an image is created by applying a voltage of selected value to the cell electrodes during the writing process. In the inventive writing tablet, the pressure of an instrument (e.g., an untethered pointed stylus) creates a focal conic line on a colored planar texture background, which is opposite to the prior art U.S. Pat. No. 6,104,448. Furthermore, the inventive writing tablet can include stacked optically active layers (cholesteric liquid crystal layers) such that when a cell of one reflective color is stacked on top of another with a different reflective color one can draw different colors as selected by the user. In a preferred embodiment a writing tablet includes a stack of three active layers reflecting blue, green and red, from the top cell down or in any order, so that multi-color images are possible. When gray scale is used, the three-cell writing tablet enables selection of full color images of virtually any color. The entire image can be erased and a new image drawn. In the inventive writing tablets, once a line of a selected color has been written on the tablet, additional lines of different colors can be drawn, enabling a multi-color image to be produced. Moreover, subsequent lines of different colors can be drawn over existing color lines on the writing tablet to produce different color images on the tablet.

BRIEF DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION

Figure 1:
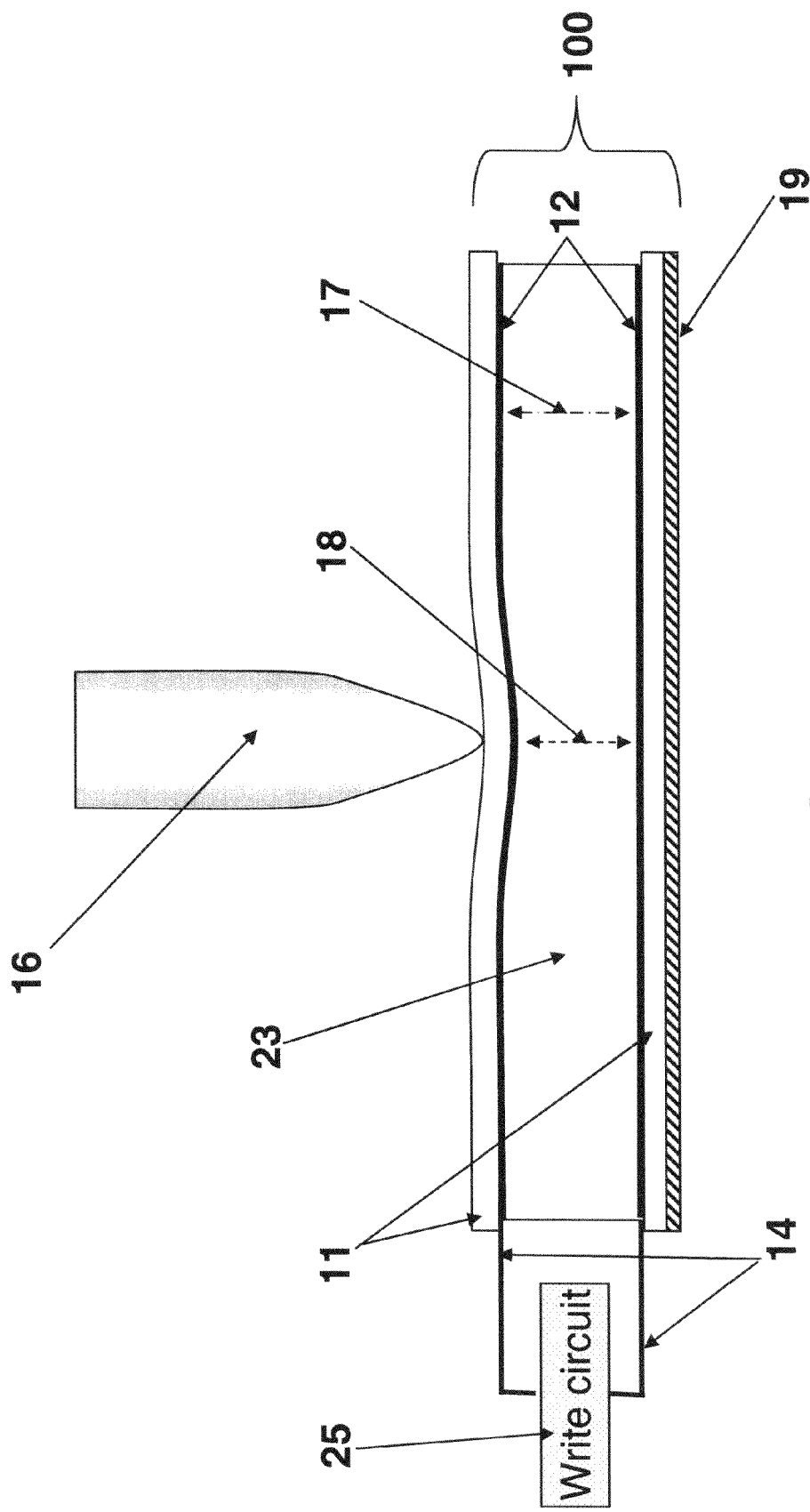
FIG. 1: Illustration of a basic cell of a writing tablet of the present invention.

1. Cell Having Focal Conic Written Portion on Planar Background:

A first embodiment of the present invention is a writing tablet in which the background state is the planar texture and the line created by the pressure of the stylus is in the focal conic texture. The bistable cholesteric writing tablet is illustrated in FIG. 1 and includes substrates 11 of transparent, flexible material in which plastic is preferred. The inner surface of the substrates are coated with transparent conductive electrodes 12 from materials such an indium tin oxide (ITO) or a conducting polymer such as PEDOT. Sandwiched between the adjacent electrodes is a bistable cholesteric material 23.

In all embodiments of the invention, all of the electrodes and substrates are transparent, except for the electrode and any substrate nearest to the light absorbing back layer (e.g., lower electrode 12 and lower substrate 11), which can be transparent or opaque.

In this embodiment in which the liquid crystal is initially in the planar texture, flow of the liquid crystal is not required for the inventive cell to form the focal conic texture using the pressure of a stylus. The droplets can be confined as separate droplets within the dispersion or the droplets can be unconfined with interconnecting droplets. The dispersions may be of the type prepared by water borne emulsions or by polymerization induced phase separation (PIPS) as is known in the art. The image is created by the unique electro-optic characteristics of the cell rather than by flow to be described later. The conducting electrodes 12 are connected with electrical interconnects 14 to electronic write circuitry 25 that provides suitable voltages to the conducting electrodes 12, usually in the form of a pulse, in order for pressure of the stylus to create an image.

Figure 2:
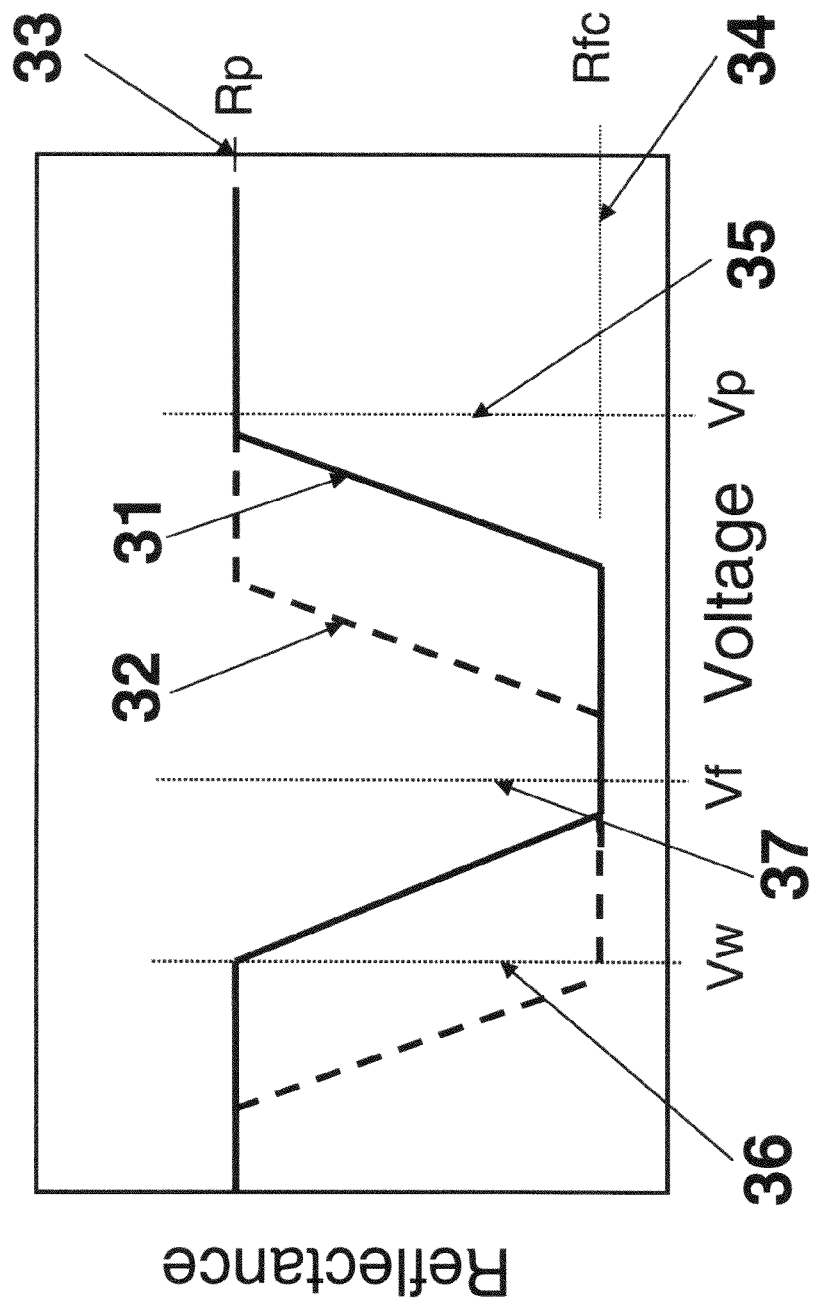
FIG. 2: Illustration of the voltage response curves used in describing the invention (with voltage increasing toward the right of the figure and reflectance increasing toward the top of the figure)

In order to explain the function of the writing circuitry 25 of FIG. 1 we turn to FIG. 2. FIG. 2 is an illustration of the voltage response shown as the Reflectance of the cell versus the Voltage of a pulse applied to the cell. There are two curves illustrated in the voltage response of FIG. 2: a solid curve 31 for the cell with an undepressed cell gap 17 and a dashed curve 32 for a reduced cell gap spacing 18 (the depressed and reduced cell gaps being shown in FIG. 1). In both the solid 31 and the dashed 32 curves of FIG. 2, the maximum light reflectance of the planar texture is indicated by Rp 33 whereas the minimum light reflectance of the focal conic texture is indicated by Rfc 34. As illustrated in FIG. 2 the effect of the pressure from the stylus is to shift the voltage response from the solid curve 31 to the dashed curve 32.

The procedure of writing an image on the inventive cell is to first erase all previous images by applying an erasing voltage of value Vp indicated by vertical line 35 to drive the cell initially to the planar texture. The value of the voltage or magnitude of a voltage pulse to do this is well known in the art of a bistable cholesteric liquid crystal displays; e.g., U.S. Pat. Nos. 5,453,863 and 5,691,795. This erases the writing tablet to the reflective planar texture so that the background color of the writing tablet is a color additive mixture of the reflective color of the cholesteric material 23 with the color of the back layer 19 of FIG. 1.

In order to write an image using stylus 16 a voltage, Vw, is applied by the write circuit 25. The value of Vw is indicated by vertical line 36 of FIG. 2. The voltage is applied for the duration of the stylus write; preferably a continuous AC voltage or a sequence of bipolar pulses. The voltage is applied to the patterned or unpatterned electrodes so that the entire display area of liquid crystal seen by the user of the writing tablet, has an electric field applied to it. It is seen by curve 32 in FIG. 2 that a voltage Vw 36 will drive that area of the cell to the focal conic texture; that is, areas of the cell under the stylus where pressure is applied and cell gap is reduced. The planar texture in that area is driven to the focal conic texture as illustrated by the dashed curve 32. In the remainder of the cell where the cell gap is not disturbed, even though the electric field has been applied here, the material will remain in the planar texture as indicated by the solid curve 31, leaving a planar background for the focal conic writing. In other words, the liquid crystal material where the cell gap is undisturbed remains in the planar texture as shown where line Vw intersects the solid line 31 (undepressed cell gap) while the voltage Vw is applied to the electrodes and is not converted to the focal conic texture. An example of the inventive writing tablet cell is photographed in FIG. 3. The write circuit 25 can also provide an erasing voltage Vp to erase the entire tablet. It is seen by FIG. 2 that a voltage Vp 35 will drive the entire cell to the planar texture, erasing the focal conic writing. The voltage may be an AC voltage pulse or a sequence of pulses, preferably bipolar pulses.

References to writing "on a background" used in this disclosure means writing a black or color line on the writing tablet in which a majority of the display area has the background color or is black, and does not mean that the background must be physically behind the writing or formed by a color of the light absorbing back layer. When the word "image" is used in this disclosure it means any black or color line and any black or color background on the writing tablet. When we say "selecting a cell" or "writing on a cell" in this disclosure, that means selecting the writing color to include the color reflected by that cell.

Figure 4:
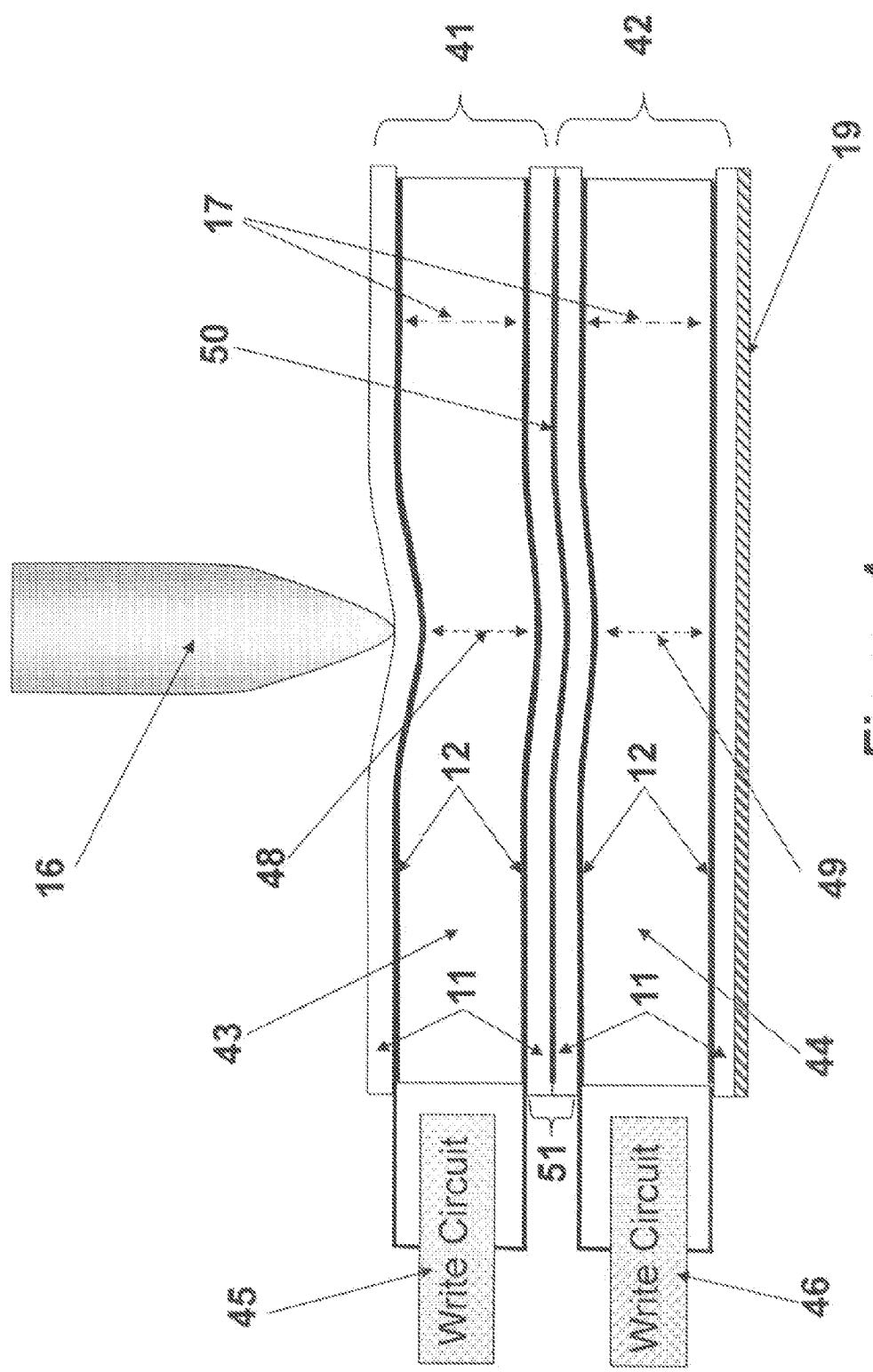
FIG. 4: Schematic illustration of a double stack multicolor writing tablet of the present invention.

II. Double Cell Writing Tablet:

We now turn to a second embodiment of the invention featuring a multiple-color tablet in which two active layers are stacked over each other (FIG. 4). The active layers can be stacked such that each cell reflects a different planar reflective color and images can be written separately on each cell with a single stylus to create multiple color images on the writing tablet. The cholesteric material of the cells each has a pitch length selected to reflect any color; preferably the colors reflected by the two cells are different than each other. Primary such reflective colors can be mixed to create a variety of colors subject to the innovation of the user. The writing tablet enables a single untethered stylus to write or draw figures in different colors as selected by the user. Writing of different colors can be achieved in at least two ways: a first Mode A in which planar texture color writing is presented on a planar texture background; and a second Mode B in which planar texture color writing is presented on a focal conic background, preferably black. Each of these modes works on a different physical principle of the cholesteric liquid crystal and will be described separately below.

The double cell writing tablet device can be made with either stacked separate cells or as a single unit sharing substrates. The word "cell" as used herein means an active layer, the electrodes on either side of it, and any substrates flanking the electrodes (i.e., on either side of the electrodes). In FIG. 4, completed cells 41 and 42 comprising different color active layers can be stacked as separate units each having separate substrate 11 with an electrode 12 on an inside surface of it, the internal substrates 11 being joined with an index matching material 50 in between them. Likewise, the stacked cells can be made as a single unit that shares a common substrate between the active layers 43 and 44, in which case the component structure having interior electrodes 12 on each interior substrate 11 with index matching material 50 between these substrates is replaced by a single substrate designated 51 with two electrodes 12 disposed on either side of it.

IIa. Double Cell Writing Tablet in Mode A:

In describing Mode A, we refer to FIG. 4 which is an illustration of a writing tablet having double stack cells. The multiple-color double-stack tablet of FIG. 4 is made up of two cells, cell 41 stacked on top of cell 42. Cell 41 is of the same construction as cell 100 of FIG. 1 containing transparent substrates 11 with transparent conducting electrodes 12, connected to a writing circuit 25; however the background coating 19 is absent. Cell 41 is stacked on top as well as optically coupled to cell 42 so as to match the index of refraction of adjacent substrates. One means of optical coupling is with a thin layer of optical index matching fluid between cells 41 and 42. Cell 42 is also identical in construction to cell 100 of FIG. 1 with transparent substrates 11 and transparent conducting electrodes 12 that are electrically connected to writing circuit 25 as well as containing background coating 19.

Cells 41 and 42 are filled with a cholesteric liquid crystal material 43 and 44, respectively. However, the cholesteric material within each cell has a different reflective color than the other cell. For example, 41 may be a cholesteric material that reflects blue light while 42 is a cholesteric material that reflects yellow light. In certain applications it may be desired that materials 43 and 44 have a different handedness for the helical twist; that is, one cell reflects right handed circular polarization and the other left. Like the cholesteric material 23 of FIG. 1, the cholesteric materials 43 and 44 of FIG. 4 are preferred to be in the form of a polymeric dispersion. The droplets can be confined as separate droplets within the dispersion since flow of the liquid crystal is not required for this embodiment of the multiple color writing tablet. Materials 43 and 44, however, may also be a droplet dispersion in which the droplets are unconfined with interconnecting droplets since flow will not affect its operation. The dispersions may be of the type prepared by water borne emulsions or by polymerization induced phase separation as is known in the art.

A procedure of writing a multicolor image on the double stack tablet in Mode A is to first erase all previous images by activating both write circuits 45 and 46 to apply voltages of value Vp indicated by vertical line 35 (FIG. 2) to drive both cells 41 and 42 into the planar texture. The value of the voltage or magnitude of a voltage pulse to do this is well known in the art of a bistable cholesteric liquid crystal displays; e.g., U.S. Pat. Nos. 5,453,863 and 5,691,795. This erases the multi-color writing tablet to the reflective planar texture so that the background color of the writing tablet is a color additive mixture of the reflective colors of the cholesteric materials 41 and 42 and any color of the back layer 19.

In order to write an image of the color of the cholesteric 43 on the top cell 41 by stylus 16 in Mode A, a voltage Vw must be applied by the write circuit 46 of the bottom cell 42 during the writing process. The value of Vw is indicated by vertical line 36 of FIG. 2. The voltage is applied for the duration of the stylus write; preferably a continuous AC voltage or a sequence of bipolar pulses. It is seen by curve 32 of FIG. 2 that a voltage Vw 36 will drive the bottom cell to the focal conic texture only in the vicinity of the stylus where pressure is applied and the cell gap is reduced. This removes the planar texture of the liquid crystal 44 in the bottom cell 42 under the stylus (i.e., in reduced gap regions). In the remainder of the bottom cell 42 where the cell gap is not disturbed, the material will remain in the planar texture as indicated by the solid curve 31. Because no voltage is applied to the electrodes for the upper cell 41, the liquid crystal 43 of the upper cell is not changed from the planar texture. This forms an image composed of a written portion (region where pressure is applied by the stylus to the writing surface) containing only the reflected light of the color of the cholesteric 43 of top cell 41 (added with any color of the back layer, referred to as a "back color") on a background color (formed by the undepressed (unwritten) regions of both cells) that is an additive mixture of the colors of the planar textures of both cells (along with any back color).

In order to write an image of the color of the cholesteric 44 on the bottom cell 42 by stylus 16 in Mode A, a voltage Vw is applied by the write circuit 45 to the top cell 41 while the writing pressure is applied to the writing surface. The value of Vw is indicated by vertical line 36 of FIG. 2. The voltage is applied for the duration of the stylus write; preferably a continuous AC voltage or a sequence of bipolar pulses. It is seen by curve 32 FIG. 2 that a voltage Vw 36 will drive the cholesteric 43 of the top cell 41 to the focal conic texture in the vicinity of the stylus where pressure is applied (i.e., at the written portion of the writing tablet) as the cell gap is reduced. In the remainder of the top cell where the cell gap is not disturbed, the material will remain in the planar texture as indicated by the solid curve 31. Therefore, the image will be composed of the written portion formed by colored light reflected from the planar texture of the cholesteric 44 of only the bottom cell 42 (added to any color of the back layer). The written portion will be apparent on a background color (formed by the undepressed regions of both cells) that is an additive mixture of the colors of the planar textures of both cells (along with any background color).

Figure 5:
FIG. 5: Photograph of a multicolor writing tablet of the invention (Mode A) with focal conic color and planar writing on a planar background.

In Mode A, the write circuits 45 and 46 can be used to erase the tablet by providing a voltage Vp to each of cells 41 and 42. It is seen by FIG. 2 that a voltage Vp 35 will drive each of the cells entirely to the planar texture. The voltage may be an AC voltage pulse or a sequence of pulses, preferably bipolar pulses. An example of the inventive multiple color writing tablet of Mode A is described in Example 2 with FIG. 5 showing a double stack writing table, which can be written on in blue, yellow or black with the same untethered stylus. For some possible color combinations that might be achieved using specific initial textures and write voltages, see Tables 1-4 of Example 5.

IIb. Double Cell Writing Tablet in Mode B

In describing Mode B, we again refer to FIG. 4. The writing tablet is identical to that described above except that the initial state of both cells is focal conic and the cholesteric materials are in the form of a polymeric dispersion that will allow localized flow caused by the writing pressure from a pointed instrument such as a pointed untethered stylus to induce the planar texture. Droplets that are unconfined or are interconnecting allow liquid crystal flow to occur under the pressure of the stylus 16 in reduced cell gap regions 48 and 49. Flow does not occur and the liquid crystal texture does not change in undepressed regions 17.

A suitable voltage applied to the electrodes will drive the cholesteric material of both cells to the initial focal conic state (see FIG. 2). When viewed from above, the tablet will exhibit the color of the background coating 19 since the focal conic texture is essentially transparent in this cell configuration. Black or blue are often preferred for the back layer 19. The pressure from the pointed stylus 16 in the locally reduced cell gap spacing 48, 49 induces flow in the cholesteric material that changes the cholesteric texture from the transparent focal conic to the color reflective planar texture in the vicinity of the tip of the stylus 16. The stylus is used to draw an image similar to drawing with a pencil on paper. The written image can then be entirely erased by applying a voltage pulse to the electrodes of sufficient value to drive all the material 13 to the focal conic state (see FIG. 2 and the '448 patent for suitable voltage to apply to each liquid crystal layer).

The procedure of writing a multicolor image on the double stack writing tablet of Mode B is to first erase all previous images by activating both write circuits 45 and 46 to apply voltages of value Vf indicated by vertical line 37 of FIG. 2 to drive both cells 41 and 42 into the focal conic texture. The value of the voltage or magnitude of a voltage pulse to do this is well known in the art of a bistable cholesteric liquid crystal displays; e.g., U.S. Pat. Nos. 5,453,863 and 5,691,795. In order to write an image reflecting the color of the cholesteric 43 on the top cell 41 only using stylus 16 a voltage Vw is applied by the write circuit 46 to the electrodes of the bottom cell 42 during the writing process. The value of Vw is indicated by vertical line 36 of FIG. 2. The voltage is applied for the duration of the stylus write; preferably a continuous AC voltage or a sequence of bipolar pulses. The purpose of the voltage is to maintain the focal conic texture of the bottom cell 42 under the action of the stylus (i.e., prevent forming the planar texture in the written portion or depressed cell gap region of the bottom cell). While this voltage is applied the pressure of the stylus does not induce a planar texture in cell 42 but maintains its focal conic texture during the writing process. The stylus does, however, induce a planar texture in the cholesteric 43 of the upper cell 41 in its vicinity (i.e., in the writing portion) that is believed to be due to lateral flow of the cholesteric liquid crystal in the reduced gap regions resulting in the focal conic texture being transformed to the planar texture. This occurs without any voltage being applied to the upper cell. Therefore, an image on a focal conic background on a stacked multicolor cell is possible by suitably applying a voltage to allow the image to be written on only one cell. The image is composed of the writing portion at a color of the light reflected from the planar texture of the cholesteric 43 of the top cell 41 (added to any color of the back layer) on the unwritten and undepressed background (black or a back color of the back layer).

Similarly, in order to form an image on the bottom cell 41 only by stylus 16 a voltage Vw must be applied by the write circuit 45 to the electrodes of the top cell 41 during the writing process. As before, both cells are initially in the focal conic texture. The value of Vw is indicated by vertical line 36 of FIG. 2. The voltage is applied for the duration of the stylus write; preferably a continuous AC voltage or a sequence of bipolar pulses. The purpose of the voltage is to maintain the focal conic texture of the top cell 41 under the action of the stylus. While this voltage is applied the pressure of the stylus does not induce a planar texture in top cell 41 but maintains its focal conic texture from the erasure process. The stylus does, however, induce a planar texture in the bottom cell 42 due to induced lateral flow of the cholesteric liquid crystal (without applying voltage to the bottom cell), resulting in the focal conic texture being transformed to the planar texture in the reduced cell gap region of the bottom cell (i.e., in the written portion). This produces an image composed of the writing portion at a color of the light reflected from the planar texture of the cholesteric 44 bottom cell 42 (added to any color of the back layer) on the unwritten and undepressed background (black or a back color of the back layer). Therefore, a planar image on a focal conic background can be selectively written separately on each cell of the stack to produce a multiple color image. Such a multicolor writing tablet is demonstrated in Example 4 with a blue reflective cell stacked on a yellow reflective cell where the colors blue, yellow and white are written on a black background. For some possible color combinations that might be achieved using specific initial textures and write voltages, see Tables 1-4 of Example 5.

IIc. Multimode Double Cell Writing Tablet:

The inventive writing tablet can also be designed so that one of the cells operates according to Mode A and the other cell operates according to Mode B. That is, one cell has an initial planar texture while the other cell has the initial focal conic texture. Writing in a color of only one of the cells (added to any back color) is selected by applying the write voltage Vw to the other cell while writing pressure is applied. The background will have the color of the undepressed regions of the planar cell (added to any back color). For example, when a first cell desired to be selected is in the initial focal conic texture, the other second cell in the planar texture has the writing voltage Vw applied during the writing process. The planar texture is erased from the second layer in the written portion where the cell gap is reduced, as Vw is applied. The writing process forms the planar texture in the written portion of the first layer where the cell gap is reduced. The resulting image will be the written portion at the planar texture of the first layer only (added to any background color) on a background formed by the planar texture of undepressed regions of the second layer (added to any background color).

Another way to form an image on the multimode, two layer writing tablet is by applying the write voltage to both cells, in effect, selecting the background. Upon writing, the planar texture is prevented from being formed in the written portion of the focal conic layer and the planar texture is erased to the focal conic in the written portion of the planar layer. This forms an image composed of a written portion in black or any back color on a background of the color reflected by the planar layer (added to any background color).

Yet another way to form an image on the multimode, two layer writing tablet is by not applying the write voltage to either layer. The writing process will form the planar texture in the written portion of the focal conic layer and will not affect the planar texture existing in the written portion of the other planar layer. This will result in an image that is the addition of the colors reflected from both layers in their written portions (along with any back color) on a background that is the color of light reflected from the planar layer (added to any back layer color).

The writing tablet can be made to produce white on black or black on white using a two cell writing tablet reflecting blue and yellow and having a black back layer. To produce white on black, Mode B is used (both cells are initially in the focal conic state) and no write voltage is applied. This results in the written portion being white (additive mixing of the blue and yellow colors reflected from both cells) on the black back layer seen through the undepressed regions of both cells. To produce black on white, Mode A is used; both cells are initially in the planar texture. During the writing process, the write voltage is applied to both cells. This results in written portions of both cells being focal conic, which shows the black back layer on a background that is white (the additive mixture of the blue and yellow reflected colors).

It should, be apparent from the foregoing that the cells can be designed the same or differently by changing the liquid crystal dispersion. In the initially planar cell, liquid crystal flow is not needed to change the planar texture to the focal conic in the layer where the writing voltage is applied. Therefore, the liquid crystal of this cell can be in confined droplets or in a dispersion of liquid crystal in a polymer matrix that does not encapsulate or confine the liquid crystal enabling it to flow. However, the liquid crystal in the initially focal conic cell must be in a dispersion that enables it to flow upon application of pressure from a pointed stylus. This allows the writing tablet to be formed from cells using different combinations of liquid crystal dispersions. For example, a writing tablet could be made so that both cells only have confined droplets of liquid crystal material in a polymer matrix using a PIPS process and will only operate in Mode A only. A writing tablet formed of unconfined droplets in both cells, or a writing tablet having a focal conic cell having unconfined droplets and confined or unconfined liquid crystal in the planar cell, could operate in Mode A, Mode B or in as a multimode writing tablet. For possible color combinations that might be achieved using specific initial textures and write voltages, see Tables 1-4 of Example 5.

III. Triple Cell Writing Tablet

Figure 8:
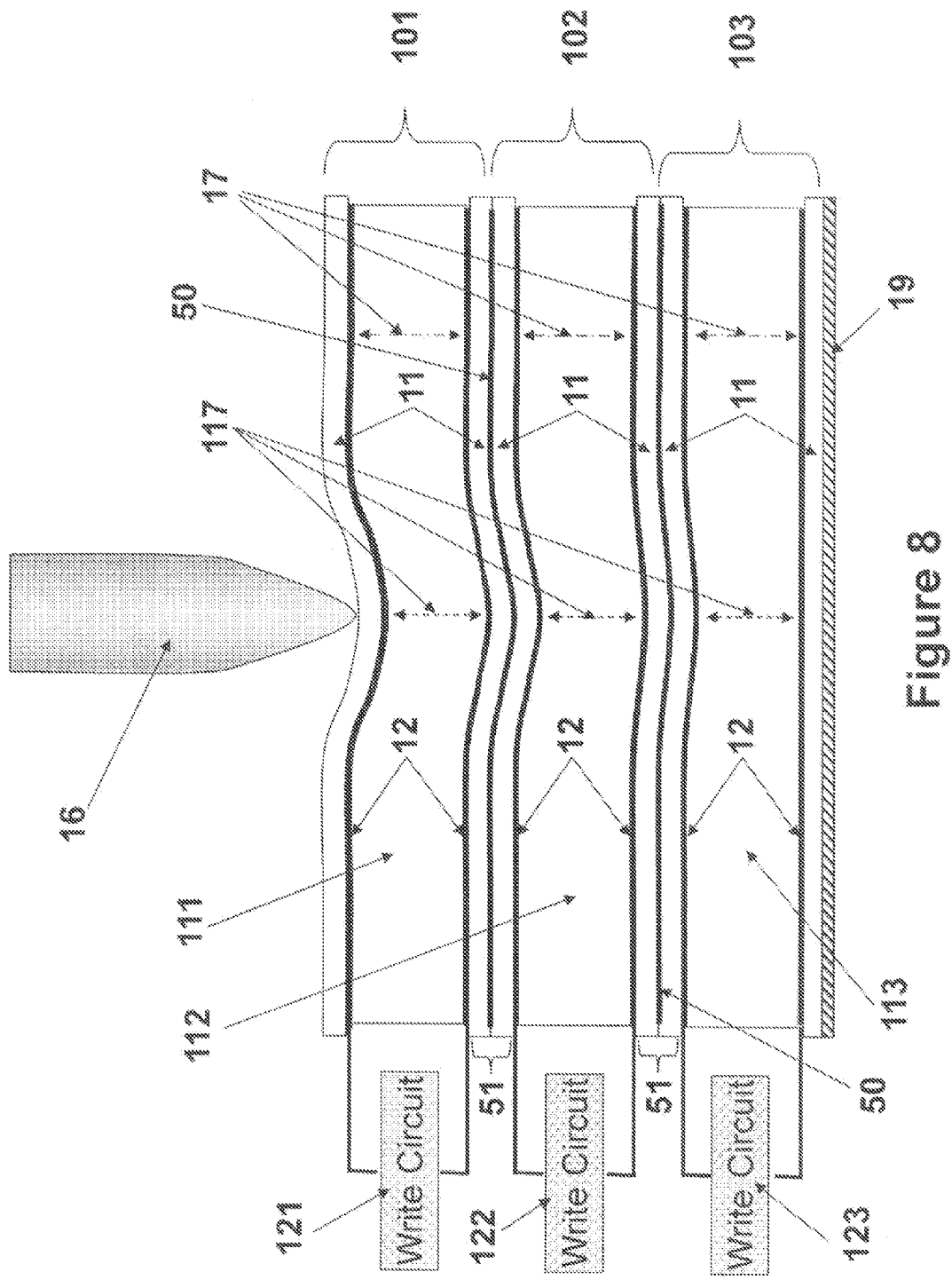
FIG. 8: Schematic illustration of a triple stack multicolor writing tablet of the present invention.

We now turn to FIG. 8 where we disclose a triple stack multicolor writing tablet. The triple-stack tablet of FIG. 8 is made up of cells 101, 102 and 103 stacked as illustrated. Cells 101 and 102 contain transparent substrates 11 with transparent conducting electrodes 12, each connected to a writing circuit. Cell 103 has transparent substrates 11 and transparent conducting electrodes 12 that are electrically connected to the writing circuit. Cell 103 contains background coating 19. Cell 101 is stacked on top of cell 102 which is in turn stacked on top of cell 103 as illustrated in FIG. 8. It is preferred that cells all be optically coupled such as by incorporating a thin layer of optical index matching fluid between cells 101 and 102 and between cells 102 and 103. Cells 101, 102 and 103 are filled with a cholesteric liquid crystal material 111, 112 and 113 respectively. The cholesteric materials of the three cells may each have a pitch length selected to reflect any color; preferably such reflective color of each cell is different than that of the others. Preferred such reflective colors for the triple stack are: blue for liquid crystal material 111; green for liquid crystal material 112 and red for liquid crystal material 113 as these primary colors when additively mixed enable the writing tablet to produce a broad range of color images particularly when shade of gray of each primary color can be invoked. In certain applications it may be desired that materials 111, 112 and 113 have a different handedness for the helical twist; for example, the top 101 and bottom 103 cells reflect right handed circular polarization where as the middle 102 and the other left. Such a configuration maximizes the reflective brightness of the writing tablet. Each of the cholesteric materials 111, 112, and 113 are in the form of a polymeric dispersion.

The triple cell writing tablet device can be made with either stacked separate cells or as a single unit sharing substrates. In FIG. 8, completed cells 101, 102 and 103 comprising different color active layers can be stacked as separate units and be joined with an index matching material 50 in between adjacent substrates. Likewise, the stacked structure can be made as a single unit that shares a common substrate between the active layers 101 and 102 or 102 and 103 as described above for the double stack display.

The triple stack includes Mode A in which a planar or focal conic line is written on a planar background and Mode B in which a planar line is written on a focal conic background. In the case of Mode A the droplets in a dispersion can be confined as separate droplets within the dispersion since flow of the liquid crystal is not required for this embodiment of the multiple color writing tablet. The dispersions may be of the type prepared by water borne emulsions or by polymerization induced phase separation as is known in the art. In Mode B the materials 111, 112 and 113 are droplet dispersions that allow localized flow sufficient to induce the planar texture. Droplets that are unconfined or are interconnecting allow flow to occur under the pressure of stylus 16 where the cell gap in the vicinity of the stylus 117 is reduced from its cell gap 17 elsewhere in the writing tablet.

IIIa. Triple Cell Writing Tablet in Mode A:

The procedure of writing a multicolor image on the triple-stack writing tablet in Mode A is to first erase all previous images by activating all write circuits 121, 122 and 123 to apply voltages of value Vp indicated by vertical line 35 of FIG. 2 to drive cells 101, 102 and 103 into the initial planar texture. The value of the voltage or magnitude of a voltage pulse to do this is well known in the art of a bistable cholesteric liquid crystal displays; e.g., U.S. Pat. Nos. 5,453,863 and 5,691,795. This erases the multi-color writing tablet to the reflective planar texture so that the background color of the writing tablet is a color additive mixture of the reflective colors of the cholesteric materials 111, 112 and 113 and any back color of the back layer 19. Using the preferred reflective colors of blue, green and red for materials 111, 112 and 113 respectively and the black back layer 19, the additive mixture will provide a white background.

In order to write an image on the top cell 101 using stylus 16, a voltage Vw must be applied by write circuit 122 and 123 to cells 102 and 103 during the writing process. The value of Vw is indicated by vertical line 36 of FIG. 2. For all embodiments of the invention it should be noted that the value of Vw depends on the color of the cholesteric liquid crystal for a given cell thickness. The threshold voltage (Vw) is inversely proportional to the cholesteric pitch length, which is defined as the length it takes for a 360° rotation of the liquid crystal molecules. So, Vw for a blue cholesteric layer will be at a higher voltage than for a red cholesteric layer for the same cell gap. The voltage is applied for the duration of the stylus write; preferably a continuous AC voltage or a sequence of bipolar pulses. It is seen by curve 32 FIG. 2 that a voltage Vw 36 will drive cell 102 and 103 to the focal conic texture in the vicinity of the stylus where pressure is applied and cell gap is reduced.

In the remainder of the cells where the cell gap is not disturbed, the material will remain in the planar texture as indicated by the solid curve 31 leaving the original background color. This produces an image composed of the written portion at the reflected color of the top cell 102 only on a background that is an additive mixture of the colors reflected by the planar texture of all three cells (along with any back color).

In order to write an image on the middle cell 102 only using stylus 16, a voltage Vw must be applied by the write circuits 121 and 123 of top and bottom cells 101 and 103, respectively, during writing. The value of Vw is indicated by vertical line 36 of FIG. 2. The voltage is applied for the duration of the stylus write; preferably a continuous AC voltage or a sequence of bipolar pulses. It is seen by curve 32 of FIG. 2 that a voltage Vw 36 will drive the top 101 and bottom 103 cell to the focal conic texture in the vicinity of the stylus where pressure is applied and cell gap is reduced. In the remainder of the cells where the cell gap is not disturbed, the material will remain in the planar texture as indicated by the solid curve 31. This produces a written line having a color of the middle cell only (additive of any back color) on a background that is an additive mixture of the colors reflected by the planar texture of all three cells (along with any back color).

In order to write an image on the bottom cell 103 only using stylus 16, a voltage Vw must be applied by the write circuits 121 and 122 of the upper and middle cells 101 and 102, respectively. The value of Vw is indicated by vertical line 36 of FIG. 2. The voltage is applied for the duration of the stylus write; preferably a continuous AC voltage or a sequence of bipolar pulses. It is seen by curve 32 of FIG. 2 that a voltage Vw 36 will drive the top 101 and middle 102 cell to the focal conic texture in the vicinity of the stylus where pressure is applied and cell gap is reduced. In the remainder of the cells where the cell gap is not disturbed, the material will remain in the planar texture as indicated by the solid curve 31. This results in a written portion having a color of the bottom cell only (additive of any back color) on a background that is an additive mixture of the colors reflected by the planar texture of all three cells (along with any back color).

Operating in Mode A, write circuits 121, 122 and 123 can be used to erase the tablet (i.e., remove all color writing from the tablet) by providing a voltage Vp to each of cells 101, 102, and 103. It is seen by FIG. 2 that a voltage Vp 35 will drive all three cells entirely to the planar texture. The voltage may be an AC voltage pulse or a sequence of pulses, preferably bipolar pulses.

Figure 9:
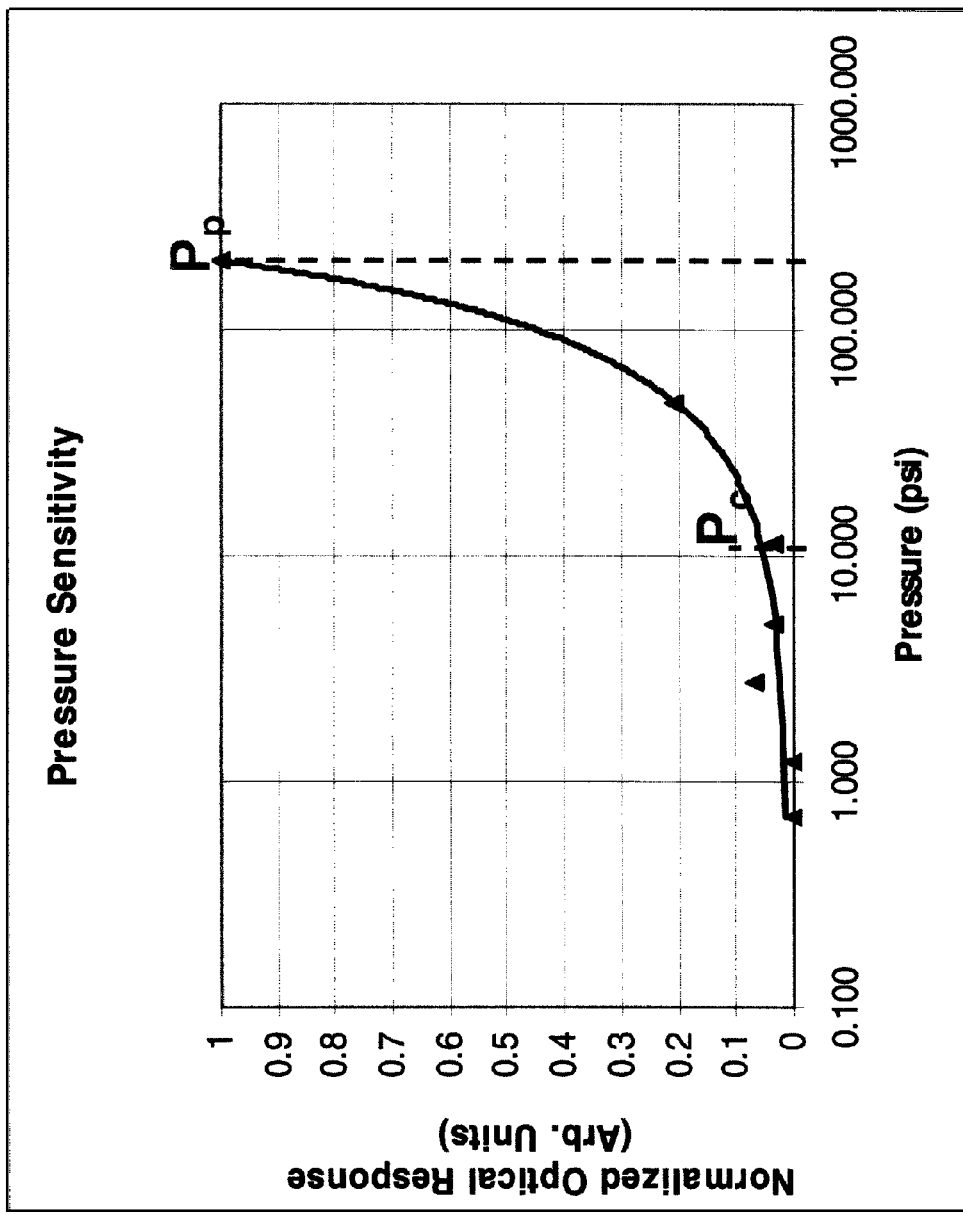
FIG. 9: Pressure sensitivity and optical response curve.

Written portions of grayscale color can be achieved in Mode A by applying either a reduced write voltage (V<Vw) or by reducing the force applied by the stylus to the display during the write. By reducing the write voltage to a value less than Vw during the write, one can see in FIG. 2 that the reflectance begins to increase, i.e., one is not inducing as many focal conic domains. In FIG. 9, (see Example 6) we can see that if one applies a writing pressure P where $P_c<P<P_p$, one can induce a grayscale planar texture. For the full color system, writing a grayscale color using the reduced voltage method is preferable as a reduced pressure would require Vf voltages applied to the other layers that will change with the cell gap, i.e., pressure applied by the stylus. Mixing of colors when the cells are at different gray levels can be used to provide a broad range of colors. A preferred triple stack writing tablet in Mode A reflects blue, green and red and has a black backlayer. This preferred writing tablet can produce a written portion of a select color of one or two of the layers on a white background. When the write voltage is applied to all of the cells of the preferred writing tablet, a black on white image can be obtained. For some possible color combinations that might be achieved using specific initial textures and write voltages, see Tables 5-12 of Example 5.

IIIb. Triple Cell Writing Tablet in Mode B

The procedure of writing a multicolor image on a triple-stack writing tablet in Mode B is to first erase all previous images by activating write circuits 121, 122, and 123 to apply voltages of value Vf indicated by vertical line 37 of FIG. 2 to drive cells 101, 102 and 103 into the initial focal conic texture. The value of the voltage or magnitude of a voltage pulse to do this is well known in the art of a bistable cholesteric liquid crystal displays; e.g., U.S. Pat. Nos. 5,453,863 and 5,691,795. This erases the multi-color writing tablet to the reflective focal texture revealing the black or color of the back layer 19.

To write an image on the top cell 101 only, using stylus 16 a voltage Vw must be applied by the write circuits 122 and 123 to the electrodes of the middle and bottom cells 102 and 103, respectively, during the writing process. The value of Vw is indicated by vertical line 36 of FIG. 2. The voltage is applied for the duration of the stylus write; preferably a continuous AC voltage or a sequence of bipolar pulses. The purpose of the voltage is to maintain the focal conic texture of cells 102 and 103 in the written region where the cell gap is reduced by the action of the stylus. While this voltage is applied the pressure of the stylus does not induce a planar texture in the written portions of cells 102 and 103 but the focal conic texture of these cells is maintained during the writing process. The stylus 19 does, however, induce a planar texture in the reduced gap region of cell 101 in its vicinity that is believed to be due to lateral flow of the cholesteric liquid crystal resulting in the focal conic texture being transformed to the planar texture. This occurs even though no voltage is applied to the upper cell. The image will be a written portion composed of the color from the planar texture of the top cell 101 only (additive with any back color) on a background of the back layer 19 (black or a back color). Therefore, a planar image on a focal conic background on a stacked multicolor cell is possible by suitably applying a voltage to allow an image to be written on only on cell.

Similarly, in order to write an image on the middle cell 102 only, using stylus 16 a voltage Vw is applied by the write circuit 121 and 123 to the electrodes of the top and bottom cells 101 and 103 during the writing process. The value of Vw is indicated by vertical line 36 of FIG. 2. The voltage is applied for the duration of the stylus write; preferably a continuous AC voltage or a sequence of bipolar pulses. The purpose of the voltage is to maintain the focal conic texture in the written portions of cells 101 and 103. While this voltage is applied the pressure of the stylus does not induce a planar texture in cells 101 and 103 but the focal conic texture of these cells is maintained during the writing process. The stylus does, however, induce a planar texture to middle cell 102 due to induced lateral flow of the cholesteric liquid crystal resulting in the focal conic texture in the written portion or reduced cell gap region of the middle cell being transformed to the planar texture. This occurs even though no voltage is applied to the middle cell. The image will be a written portion composed of the color from the planar texture of the middle cell 102 only (additive with any back color) on a background of the back layer 19 (black or a back color).

Similarly, in order to write an image on the bottom cell 103 only using stylus 16 a voltage Vw is applied by the write circuit 121 and 122 to the electrodes of the top and middle cells 101 and 102 during the writing process. The value of Vw is indicated by vertical line 36 of FIG. 2. The voltage is applied for the duration of the stylus write; preferably a continuous AC voltage or a sequence of bipolar pulses. The purpose of the voltage is to maintain the focal conic texture of cells 101 and 102 under the action of the stylus. While this voltage is applied the pressure of the stylus does not induce a planar texture in the written portions of the upper and middle cells 101 and 102 but maintains their focal conic texture during the writing process. The stylus does, however, induce a planar texture to bottom cell 103 in the written portion thereof due to induced lateral flow of the cholesteric liquid crystal resulting in the focal conic texture being transformed to the planar texture. Therefore a planar image on a focal conic background can be selectively written separately on each cell of the stack to produce a multiple color image. The image will be a written portion composed of the color from the planar texture of the bottom cell 103 only (additive with any back color) on a background of the back layer 19 (black or a back color).

A preferred three cell writing tablet in Mode B has respective reflective colors of the cholesteric liquid crystal layers 111, 112 and 113 that are blue, green and red as well as a background coating 19 that is black. The preferred triple stack writing tablet in Mode B can also produce a written portion of one or two select colors of one or two of the layers on the black background. These primary colors can be mixed to create intermediate colors. For example, the color of each layer can be placed at different levels of reflectivity or shades of gray, enabling images of multiple colors to be achieved by controlling the pressure of the stylus or by suitably controlled voltages less than voltage level Vw. In addition, when no write voltage is applied to all three cells of the preferred writing tablet, a written white on black background can be obtained when operating the preferred three cell writing tablet in Mode B. For some possible color combinations that might be achieved using specific initial textures and write voltages, see Tables 5-12 of Example 5.

Writing tablets including additional stacked cells beyond the triple stack are possible with various combinations or reflective wavelengths including infrared and ultraviolet in addition to differing cholesteric materials such has different circular polarization handedness.

IIIc. Triple Cell Writing Tablet in Multimode:

The triple cell writing tablet of FIG. 8 can operate in a multimode where the initial states are: two cells are focal conic and the third cell is planar; or where two cells are planar and the third cell is focal conic. This enables the following possibilities. Where the initial states are as follows: two cells are focal conic and the third is planar, 1) the writing tablet can produce a written portion that includes the selected color of one of the active layers on a background color that includes the color of one of the layers. This configuration also permits 2) forming a written portion that includes the additive mixing of the colors from two of the layers on a background color that includes the color of one of the layers. Where the initial states are as follows: two cells are planar and the third is focal conic, 3) a written portion can include the color of one selected layer on a background color that is an additive mixture of the colors of two of the layers. This also permits the possibility of 4) a written portion including a color that is the additive mixture of colors from two of the active layers on a background that includes the colors of two of the active layers. For some possible color combinations that might be achieved using specific initial textures and write voltages, see Tables 5-12 of Example 5.

The applications of writing tablets are endless such as for toys, artist easels, wall mounted "white boards," sketch pads, refrigerator or appliance mounted tablets, office signs, store signs, other signage, office furniture etc.

The inventive writing tablet can be used with an optically transparent touch screen overlay (e.g., MicroTouch Flex Capacitive Touch Sensor supplied by 3M Touch Systems, Inc.) so that when writing onto the touch screen through to the writing tablet below, the touch screen would register where the writing is made, enabling images written on the writing tablet to be stored. In addition, touch screen overlays such as the MicroTouch Flex Capacitive Touch Sensor can be easily integrated in a roll-to-roll process with the writing tablet system since they are both plastic, can be manufactured roll-to-roll and can be simply laminated together.

Not only can touchscreen overlays be integrated with the inventive writing tablet, the writing tablet itself can be made into a capacitive touchscreen sensor by simply modifying the electronics to both scan at Vw and sense either the applied voltage and/or current. If the top and bottom substrates are patterned with conductors in a row column format, the cell gap change may be mapped by tracking the current flowing between row and column or a capacitive change between row and column (which may require a frequency sweep during the Vw scan). In Mode A, the display is being scanned at Vw. This Vw scan can be used as either a capacitive or current probe. If one maps the change in capacitance or the change in current with respect to the row/column coordinate (location), one can digitally map the writing input and store this as an image. In this manner the writing tablet becomes a touch screen where the visual information is updated in real-time but the digital input is stored to a screen map that can be digitized.

The invention will now be described by reference to the following examples to illustrate, rather than limit, the invention.

EXAMPLE 1

A bistable cholesteric writing tablet 100 (FIG. 1) was fabricated to demonstrate the inventive effect of utilizing the characteristics of the voltage response curve to write an image with the pressure of an untethered stylus comprising a written portion in the focal conic texture on a planar texture background. A writing tablet cell with a 4 micron cell gap was constructed from 2 substrates and an active layer. The top and bottom substrates were made from 2 mil thick Polyethylene Terephthalate (PET) that had an unpatterned electrode made from a Meyer rod coated PEDOT-based conducting polymer (AGFA) covering the entire surface area of the interior surface of both substrates. The active layer consisted of a polymer-dispersed yellow (580 nm) cholesteric liquid crystal (Merck).

The active layer of the writing tablet is made from a blend of polymerizable monomer (prepolymer) and cholesteric liquid crystal. The dispersion was created by non-encapsulating polymerization induced phase separation of a cholesteric liquid crystal using monomer chemistry similar to what is described in U.S. Pat. No. 7,351,506 B2. The active layer of the writing tablet was made from using a UV curable methacrylate-based monomer, acrylate-based cross-linker, diphenyl photoinitiator, and 4 micron spherical polyvinylidine spacers. The mixture consisted of:

75% (wt.) KLC19 (Kent Displays, Inc.) cholesteric liquid crystal premixed to selectively Bragg reflect yellow light at the desired peak reflective wavelength of 580 nm 25% (wt.) photo-polymerizable monomer consisting of:
  81.6% (wt.) methyl methacrylate
  14.7% (wt.) trimethylolpropane triacrylate
  2.0% (wt.) Irgacure 651 (Ciba Specialty Chemicals)
  1.7% (wt.) lauryl methacrylate The spherical plastic spacers were added to the system at 3% (wt.) of the total weight of the liquid crystal/monomer mixture. The mixture was than laminated between the two conductive polymer coated PET substrates. The system was cured by exposure to UV light at 0.92 mW/cm$^2$ irradiance for 15 minutes. After curing the polymerizable mixture, the cell is backpainted blue and then laser-singulated (as described in US Patent Application Publication 2007/0277659A1) to the desired shape.

Electrical connections were made with silver tape, an electrically conductive tape (Adhesives research), attached to both the top and bottom ledge where the conductive polymer electrode is exposed. The display was attached to a 1/16 inch thick clear acrylic backer for mounting support. The display and backer were then mounted in a frame. The electronics are attached to the conductive tape to complete fabrication of the writing tablet. The writing tablet electronics create a voltage sufficient to switch the LC material and to apply this voltage to the display electrodes in a specific sequence. Typically this requires a voltage boost circuit to transform the given battery voltage to a higher voltage optimized for switching or writing on the display. This is accomplished using a traditional switching inductor supply or capacitive charge pump supply circuit. The display has two connections relating to the top substrate electrode and the bottom substrate electrode respectively. Analog switches select either high voltage or ground for each electrode. This selection is controlled by a microcontroller or other such display controller so that the analog switches can be switched in such a sequence to create the proper waveform. The waveform and magnitude of the voltage pulse to switch the display are well known in the art of a bistable cholesteric liquid crystal displays; e.g., U.S. Pat. Nos. 5,453,863 and 5,691,795. Selecting the various waveforms and magnitudes of the write voltage Vw for the liquid crystal layer would be apparent to one of ordinary skill in the art in view of this disclosure (e.g., FIG. 2) and that of these patents.

Figure 3:
FIG. 3: Photograph of inventive writing tablet demonstration of Example 2.

The procedure for writing on the tablet is to first apply a voltage pulse to erase the cell to the planar texture. A 40 volt 100 ms AC square wave voltage pulse (square wave periodicity of 10 ms) was applied to the electrodes of the tablet to drive the cholesteric cell to the planar texture. In this texture, the writing tablet appears white because the yellow reflective color of the cholesteric planar texture additively mixes with the blue paint on the back of the cell to produce a white color. In order to write an image, a continuous AC square wave voltage Vw of 6 volts was applied to the electrodes while applying pressure on the tablet either with a pointed stylus or finger nail. A photograph of the writing tablet operating in Mode A is shown in FIG. 3 (with electronics detached) where it is seen that the image appears as a blue line on white background since the pressure of the stylus with a voltage applied to the electrodes drives the cholesteric material to the transparent focal conic texture showing the blue back layer of the tablet cell.

In order to demonstrate the effect of the writing voltage on the gray scale levels of the cell, different voltages below 6 volts were applied with identical pressure while writing showing that the reflectivity of the written portion increased as the voltage is lowered (decreasing contrast of the image by making the written portion have a brighter reflectivity closer to that of the background). It is seen that the image vanished nearly altogether below 4 volts. This indicates that gray levels can be achieved by varying the voltage and that in this case the gray level region is approximately between 4 and 6 volts. The entire writing tablet could be erased by applying a 50 volt AC square wave waveform to the electrodes across the electrodes for 100 ms in duration, placing the entire cell in the planar texture. It should be noted that one is also able to achieve a grayscale with the device by changing the writing pressure while applying a constant 6V. Higher pressure results in a darker (less reflective) written portion (due to the reduced cell gap while under application of Vw) whereas lower pressure results in a brighter (more reflective) written portion for a constant voltage. The written portion becomes darker or lighter depending on the density of the focal conic to planar domains in the reduced gap region (e.g., written portions become darker by reducing the density of planar/focal conic domains in the reduced gap region).

EXAMPLE 2

A double stack multiple color writing tablet, as schematically shown in FIG. 4 with both cells in Mode A was constructed enabling writing the colors blue, yellow or black on a white background as selected by the user with the same untethered stylus. A first or upper cell 41 was constructed identical to the writing tablet cell of Example 1 with a 4 micron cell gap spacing except that the cholesteric liquid crystal (Merck) was selected to be one that Bragg-reflects blue light at a peak wavelength of approximately 470 nm. Furthermore, no background coating was placed on the upper cell so that all of the incident visible light that was not reflected by the cholesteric material of the first cell passed through it. A second cell 42 was constructed identical to the writing tablet cell 100 of Example 1 with a 4 micron cell gap spacing and with the cholesteric liquid crystal that reflects yellow light at a peak wavelength of approximately 580 nm. The second cell contained a black background coating 19. The first cell was fixedly stacked on top of the second cell with one drop of isopropyl alcohol in between adjacent substrates of the cells to serve as an optical index matching material. Electrical connections to the displays were made with an electrically conductive woven silver tape (Adhesives research), attached to both the top and bottom ledges of both cells where the conductive polymer electrode is exposed. A function generator (Analogic Polynomial Waveform Synthesizer Model 2020) and amplifier (Kepco BOP500M) were connected to the silver tape electrodes of the cells using alligator clips, FIG. 5.

The cells were first erased to the planar state by applying a 50V, 100 ms pulse with a 10 ms period bipolar square to the electrodes of the top and bottom cells. With these pulses both cells were switched to the planar texture and the writing tablet exhibited a white reflective color as the blue color of the top cell and yellow color of the bottom cell additively mixed to yield white. A black image was then written on the stacked multicolor tablet by applying a continuous 6V square wave voltage Vw with a 10 ms periodicity to the electrodes of both the top 41 and bottom 42 cells while writing the word "BLACK". Notice the resultant black color word "BLACK" written on the white display as shown in the photograph of FIG. 5. The voltage was removed from the electrodes and the image remained as photographed.

A blue image was written on the multicolor tablet by applying a continuous 6V square wave voltage Vw with a 10 ms periodicity to the electrodes of the bottom yellow cell 42 only while the pressure of a pointed stylus was applied to write the word "BLUE" as shown in the photograph of FIG. 5. The voltage was removed from the electrodes and the images remained as photographed.

A yellow image was then written on the multicolor tablet by applying a continuous 6V square wave voltage Vw with a 10 ms periodicity to the electrodes of the top cell only while the pressure of a pointed stylus was used to write the word "YELLOW" as shown in the photograph of FIG. 5. The voltage was removed from the electrodes and the images remained as photographed. The images could then be erased to show a white field on the display by applying a 50V, 100 ms pulse with a 10 ms period bipolar square to the electrodes of the top and bottom cells.

EXAMPLE 3

Figure 6:
FIG. 6: Photograph of a multicolor writing tablet of the invention demonstrating gray levels.

Gray level capability of the double stack multicolor writing tablet in Mode A was demonstrated by using the double stack multicolor writing tablet of Example 2. To demonstrate gray levels, both the top and bottom cells were erased to the planar texture by applying a 50V, 100 ms pulse with a 10 ms period bipolar square to the electrodes of the top cell and of the bottom cell providing a white background. A black image was then written on the stacked multicolor tablet by first applying a continuous square wave voltage Vw with a 10 ms periodicity to the electrodes of both the top and bottom cell. The uniform pressure of a pointed weighted stylus was then used to write various words on the display while Vw was applied to the electrodes of both cells. The first word, "HI!" as shown in the photograph of FIG. 6, was written at 7V using the continuous square waveform with a 10 ms periodicity. The value of the continuously applied voltage was then stepped down to 6V and the stylus used to write the image "HELLO" as shown in the photo of FIG. 6. The value of the continuously applied voltage was then stepped down to 5V and the stylus used to write the image "GRAY" where it is shown in the photo of FIG. 9 to be less contrasting than the 6V or 7V images. The value of the continuously applied voltage was then stepped down to 4V and the stylus used to write the image "GRAY 2" where it is shown in the photo of FIG. 6 to be less contrasting than the 5V image. A further reduction in voltage to 1V showed further reduction in contrast where the image was barely visible in the photograph. This clearly demonstrates the levels of gray are possible to achieve on the multicolor writing tablet (i.e., the reflectivity of the writing increased as the values of Vw applied during writing decreased). With gray level capability, numerous colors become possible on a stacked multicolor writing tablet in that mixed gray levels of different colors additively mix to achieve intermediate colors on a chromaticity chart.

EXAMPLE 4

We constructed a multiple color writing tablet of Mode B using a double stack writing tablet schematically depicted in FIG. 4 on which can be written images in the colors blue, yellow or white on a black background as selected by the user with the same untethered stylus. In this Example we used the same double stacked writing tablet of Examples 2 and 3 (using first blue cell 41 and second yellow cell 42 and non-encapsulating PIPs processing of the polymer dispersed liquid crystal material. The writing tablet was first erased to the focal conic texture by applying a 20V, 100 ms pulse with a 10 ms period bipolar square to the electrodes of the top cell and of the bottom cell. With these pulses both cells were switched to the focal conic texture and the writing tablet exhibited a black reflective color since the focal conic texture is transparent revealing the black color of the background coating 19 of the bottom cell.

Figure 7:
FIG. 7: Photograph of a multicolor writing tablet of (Mode B) with planar color writing on a focal conic background.

A white image was then written on the stacked multicolor tablet by the pressure of a pointed stylus. FIG. 7 shows a photograph of such an image in which the stylus was used to write the word "WHITE". Note that no voltage was applied to the cells during the writing process. The pressure of the stylus induced flow in the liquid crystal which further induced the planar texture. Liquid crystal flow under the stylus tip induced the blue planar texture in the upper cell as well as the yellow planar texture in the lower cell. Both of these colors additively mixed to yield the white reflective color on the black background of the multicolor writing pad.

A blue image was then written on the multicolor tablet by applying a continuous 6V square wave voltage Vw with a 10 ms periodicity to the electrodes of the bottom (yellow) cell 42 only and the pressure of a pointed stylus then used to write the word "BLUE" as shown in the photograph of FIG. 7. Note that in this case, voltage applied to the electrodes of the lower (yellow) cell 42 maintain the focal conic texture of the lower cell so that no planar image is written on that cell. However, a blue image is written on the upper cell 41 without applying any voltage to the electrodes of that cell, where flow drives the focal conic texture to the planar texture in the vicinity of the stylus.

A yellow image was then written on the multicolor tablet by applying a continuous 6V square wave voltage Vw with a 10 ms periodicity to the electrodes of the top cell 41 only and the pressure of a pointed stylus then used to write the word "YELLOW" as shown in the photograph of FIG. 9. Note that in this case, voltage applied to the electrodes of the upper (blue) cell 41 maintains the focal conic texture of the upper cell so that no planar image is written on that cell. However, a yellow image is written on the lower cell 42 without applying any voltage to the electrodes of that cell, where flow drives the texture to the planar texture in the vicinity of the stylus. The multicolor image on the writing tablet could be erased by applying a 20V, 100 ms pulse with a 10 ms period bipolar square to the electrodes of the top cell and of the bottom cell.

EXAMPLE 5

The following Tables 1-4 illustrate some possible color images that might be produced by a two cell writing tablet where the cells are in the indicated states upon application of the indicated writing voltages. A two cell writing tablet that was actually made and achieved some of these images is described in the examples (Modes A and B). Other images described in Tables 1-4 below are conceptually possible. The writing tablet would have cell 1 as a top cell stacked over a bottom cell 2. A black back layer would be located below cell 2 to absorb light passing through cells 1 and 2. The chiral additives of cells 1 and 2 would enable the cholesteric liquid crystal of cells 1 and 2 to reflect blue and yellow, respectively, when in the planar texture. The addition of light reflected from both layers may appear white.

It should be understood that the cholesteric liquid crystal materials can be modified to reflect any desired color rather than the yellow and blue colors noted here. This would produce an additive mixture of these colors where appropriate instead of the white noted here. The indicated color images when at least one of the cells is in the focal conic texture would be achieved when the writing is at an intended normal writing pressure. If a color back layer is used, the writing color, as well as the background color, would be the color of the back layer alone (instead of the color black where indicated in the tables) or the back color additively mixed with the colors indicated below. This could also change conditions where there is no image. Gray scale is possible when varying writing pressure (see Example 6) or writing voltage (see FIG. 2) but the various possible color combinations are not shown here. It will be apparent that using gray scale many colors can be produced by the inventive writing tablet.

TABLE 1

Mode A (White Background)

| 2 Layer Color Combination | Active Layer 1 | Active Layer 2 | [Writing Color] on (Background Color) |
|---|---|---|---|
| Initial Active Layer State | Planar | Planar | (white) |
| Vw applied 1 | No | Yes | [blue] on (white) |
| Vw applied 2 | Yes | No | [yellow] on (white) |
| Vw applied 3 | Yes | Yes | [black] on (white) |
| Vw applied 4 | No | No | [white] on (white) No image |

TABLE 2

Mode B (Black Background)

| 2 Layer Color Combination | Active Layer 1 | Active Layer 2 | [Writing Color] on (Background Color) |
|---|---|---|---|
| Initial Active Layer State | focal conic | focal conic | (black) |
| Vw applied 5 | No | Yes | [blue] on (black) |
| Vw applied 6 | Yes | No | [yellow] on (black) |
| Vw applied 7 | No | No | [white] on (black) |
| Vw applied 8 | Yes | Yes | [black] on (black) No Image |

TABLE 3

Multimode (Yellow Background)

| 2 Layer Color Combination | Active Layer 1 | Active Layer 2 | [Writing Color] on (Background Color) |
|---|---|---|---|
| Initial Active Layer State | focal conic | Planar | (yellow) |
| Vw applied 9 | No | No | [white] on (yellow) |
| Vw applied 10 | Yes | Yes | [black] on (yellow) |
| Vw applied 11 | No | Yes | [blue] on (yellow) |
| Vw applied 12 | Yes | No | [yellow] on (yellow) No Image |

TABLE 4

Multimode (Blue Background)

| 2 Layer Color Combination | Active Layer 1 | Active Layer 2 | [Writing Color] on (Background Color) |
|---|---|---|---|
| Initial Active Layer State | Planar | focal conic | (blue) |
| Vw applied 13 | Yes | No | [yellow] on (blue) |
| Vw applied 14 | Yes | Yes | [black] on (blue) |
| Vw applied 15 | No | No | [white] on (blue) |
| Vw applied 16 | No | Yes | [Blue] on (blue) No Image |

The following Tables 5-12 illustrate some conceptually possible color images that might be produced by a triple cell writing tablet in the indicated initial states upon application of the indicated writing voltages. This writing tablet would have cell 1 as a top cell stacked over a middle cell 2, and cell 2 would be stacked over cell 3. A black back layer would be located below cell 3. The chiral additives of cells 1, 2 and 3 would enable the cholesteric liquid crystal of cells 1, 2 and 3 to reflect blue, green and red, respectively, when in the planar texture. It should be understood that the cholesteric liquid crystal materials can be modified to reflect any desired color rather than the blue, green and red colors noted here. This would produce an additive mixture of these colors where appropriate instead of the white noted here. The indicated color images when at least one of the cells is in the focal conic texture would be achieved when the writing is at an intended normal writing pressure. If a color back layer is used, the writing color, as well as the background color, would be the color of the back layer alone (instead of the color black where indicated in the tables) or the back color additively mixed with the colors indicated below. This could also change conditions where there is no image. Gray scale is possible when varying writing pressure (see Example 6) or writing voltage (see FIG. 2) but the various possible color combinations are not shown here. It will be apparent that using gray scale thousands of colors can be produced by the inventive writing tablet.

TABLE 5

Full Color Mode A (White Background)

| 3 Layer Color Combination | Active Layer 1 | Active Layer 2 | Active Layer 3 | [Writing Color] on (Background Color) |
|---|---|---|---|---|
| Initial Active Layer State | planar | planar | planar | (white) |
| Vw 1 | No | Yes | Yes | [blue] on (white) |
| Vw 2 | Yes | No | Yes | [green] on (white) |
| Vw 3 | Yes | Yes | No | [red] on (white) |
| Vw 4 | Yes | Yes | Yes | [black] on (white) |
| Vw 5 | No | No | No | [white] on (white) No Image |
| Vw 6 | Yes | No | No | [green + red = yellow] on (white) |
| Vw 7 | No | Yes | No | [blue + red = magenta] on (white) |
| Vw 8 | No | No | Yes | [blue + green = cyan] on (white) |

TABLE 6

Full Color Mode B (Black Background)

| 3 Layer Color Combination | Active Layer 1 | Active Layer 2 | Active Layer 3 | [Writing Color] on (Background Color) |
|---|---|---|---|---|
| Initial Active Layer State | focal conic | focal conic | focal conic | (black) |
| Vw 9 | No | Yes | Yes | [blue] on (black) |
| Vw 10 | Yes | No | Yes | [green] on (black) |
| Vw 11 | Yes | Yes | No | [red] on (black) |
| Vw 12 | No | No | No | [white] on (black) |
| Vw 13 | Yes | Yes | Yes | [black] on (black) No Image |
| Vw 14 | Yes | No | No | [green + red = yellow] on (black) |
| Vw 15 | No | Yes | No | [blue + red = magenta] on (black) |
| Vw 16 | No | No | Yes | [blue + green = cyan] on (black) |

TABLE 7

Multimode (Yellow Background)

| 3 Layer Color Combination | Active Layer 1 | Active Layer 2 | Active Layer 3 | [Writing Color] on (Background Color) |
|---|---|---|---|---|
| Initial Active Layer State | focal conic | planar | planar | (green + red = yellow) |
| Vw 17 | No | Yes | Yes | [blue] on (green + red = yellow) |
| Vw 18 | Yes | No | Yes | [green] on (green + red = yellow) |
| Vw 19 | Yes | Yes | No | [red] on (green + red = yellow) |
| Vw 20 | No | No | No | [white] on (green + red = yellow) |
| Vw 21 | Yes | Yes | Yes | [black] on (green + red = yellow) |
| Vw 22 | Yes | No | No | [green + red = yellow] on (green + red = yellow) No Image |
| Vw 23 | No | Yes | No | [blue + red = magenta] on (green + red = yellow) |
| Vw 24 | No | No | Yes | [blue + green = cyan] on (green + red = yellow) |

TABLE 8

Multimode (Blue Background)

| 3 Layer Color Combination | Active Layer 1 | Active Layer 2 | Active Layer 3 | [Writing Color] on (Background Color) |
|---|---|---|---|---|
| Initial Active Layer State | planar | focal conic | focal conic | (blue) |
| Vw 25 | No | Yes | Yes | [blue] on (blue) No Image |
| Vw 26 | Yes | No | Yes | [green] on (blue) |
| Vw 27 | Yes | Yes | No | [red] on (blue) |
| Vw 28 | No | No | No | [white] on (blue) |
| Vw 29 | Yes | Yes | Yes | [black] on (blue) |
| Vw 30 | Yes | No | No | [green + red = yellow] on (blue) |
| Vw 31 | No | Yes | No | [blue + red = magenta] on (blue) |
| Vw 32 | No | No | Yes | [blue + green = cyan] on (blue) |

TABLE 9

Multimode (Magenta Background)

| 3 Layer Color Combination | Active Layer 1 | Active Layer 2 | Active Layer 3 | [Writing Color] on (Background Color) |
|---|---|---|---|---|
| Initial Active Layer State | planar | focal conic | planar | (blue + red = magenta) |
| Vw 33 | No | Yes | Yes | [blue] on (blue + red = magenta) |
| Vw 34 | Yes | No | Yes | [green] on (blue + red = magenta) |
| Vw 35 | Yes | Yes | No | [red] on (blue + red = magenta) |
| Vw 36 | No | No | No | [white] on (blue + red = magenta) |
| Vw 37 | Yes | Yes | Yes | [black] on (blue + red = magenta) |
| Vw 38 | Yes | No | No | [green + red = yellow] on (blue + red = magenta) |
| Vw 39 | No | Yes | No | [blue + red = magenta] on (blue + red = magenta) No Image |
| Vw 40 | No | No | Yes | [blue + green = cyan] on (blue + red = magenta) |

TABLE 10

Multimode (Green Background)

| 3 Layer Color Combination | Active Layer 1 | Active Layer 2 | Active Layer 3 | [Writing Color] on (Background Color) |
|---|---|---|---|---|
| Initial Active Layer State | focal conic | planar | focal conic | (green) |
| Vw 41 | No | Yes | Yes | [blue] on (green) |
| Vw 42 | Yes | No | Yes | [green] on (green) No Image |
| Vw 43 | Yes | Yes | No | [red] on (green) |
| Vw 44 | No | No | No | [white] on (green) |
| Vw 45 | Yes | Yes | Yes | [black] on (green) |
| Vw 46 | Yes | No | No | [green + red = yellow] on (green) |
| Vw 47 | No | Yes | No | [blue + red = magenta] on (green) |
| Vw 48 | No | No | Yes | [blue + green = cyan] on (green) |

TABLE 11

Multimode (Cyan Background)

| 3 Layer Color Combination | Active Layer 1 | Active Layer 2 | Active Layer 3 | [Writing Color] on (Background Color) |
|---|---|---|---|---|
| Initial Active Layer State | planar | planar | focal conic | (blue + green = cyan) |
| Vw 49 | No | Yes | Yes | [blue] on (blue + green = cyan) |
| Vw 50 | Yes | No | Yes | [green] on (blue + green = cyan) |
| Vw 51 | Yes | Yes | No | [red] on (blue + green = cyan) |

TABLE 11-continued

Multimode (Cyan Background)

| 3 Layer Color Combination | Active Layer 1 | Active Layer 2 | Active Layer 3 | [Writing Color] on (Background Color) |
|---|---|---|---|---|
| Vw 52 | No | No | No | [white] on (blue + green = cyan) |
| Vw 53 | Yes | Yes | Yes | [black] on (blue + green = cyan) |
| Vw 54 | Yes | No | No | [green + red = yellow] on (blue + green = cyan) |
| Vw 55 | No | Yes | No | [blue + red = magenta] on (blue + green = cyan) |
| Vw 56 | No | No | Yes | [blue + green = cyan] on (blue + green = cyan) No Image |

TABLE 12

Multimode (Red Background)

| 3 Layer Color Combination | Active Layer 1 | Active Layer 2 | Active Layer 3 | [Writing Color] on (Background Color) |
|---|---|---|---|---|
| Initial Active Layer State | focal conic | focal conic | planar | (red) |
| Vw 57 | No | Yes | Yes | [blue] on (red) |
| Vw 58 | Yes | No | Yes | [green] on (red) |
| Vw 59 | Yes | Yes | No | [red] on (red) No Image |
| Vw 60 | No | No | No | [white] on (red) |
| Vw 61 | Yes | Yes | Yes | [black] on (red) |
| Vw 62 | Yes | No | No | [green + red = yellow] on (red) |
| Vw 63 | No | Yes | No | [blue + red = magenta] on (red) |
| Vw 64 | No | No | Yes | [blue + green = cyan] on (red) |

EXAMPLE 6

We constructed a single layer writing tablet as outlined in Example 1 for the purposes of evaluating pressure sensitivity and grayscale. When the writing tablet operates in Mode B in which the entire writing surface is initially in the focal conic state, a sufficient force per unit area is applied with a stylus to reduce the electrode gap. As the electrode gap is decreased, liquid crystal is displaced and flows away from the pressure point, resulting in a reduced thickness of the liquid crystal in the region. As the liquid crystal flows, it causes the cholesteric liquid crystal to align to the planar state that remains stable after flow has stopped. The highly reflective planar state contrasts with the nearly transparent focal conic state to give the impression of bright writing on a dark background.

Selective pressure sensitivity is preferable for a practical writing tablet as one writes with a hand resting on the writing surface. The inventive writing tablet is selectively pressure sensitive; i.e., the planar reflective texture is only induced from the focal conic texture when a sufficiently localized force per unit area is able to change the electrode gap. If the force is distributed over a large area, the electrode gap is insignificantly changed or not changed at all, and the liquid crystal does not flow enough to induce the planar texture. So, if one rests or drags their hand across the display while writing, no information is recorded. However, if one presses into the display with a narrowly distributed force of a pointed stylus (i.e., with pointed pressure), the liquid crystal flows and the planar texture is induced.

FIG. 9 shows the optical response of an exemplary writing tablet to pointed pressure. The critical pressure is denoted PC and is approximately 10 pounds per square inch (psi). Notice that when $P<P_c$, the device has no optical response, i.e., it does not switch to the planar state and is pressure insensitive. (The solid triangles in the figure are the normalized optical response as measured by the reflectivity of the written texture given by the Minolta Spectrophotometer CM-508d. The line is a fit to the data and shows the overall optical-pressure response.) The lack of optical response is due to the fact that the pressure was not sufficient enough to displace the liquid crystal and induce flow, i.e., the solid polymer/spacer structure was sufficient to support the applied pressure without allowing a deflection of the top substrate. When $P>P_c$, the device is pressure sensitive and writes to the planar state, i.e., the liquid crystal is displaced, flows and ends up in a planar texture. $P_p$ is the pressure required to write a 100% planar texture and is seen in FIG. 9 where the optical response saturates around 200 psi or so. A grayscale in the optical response may be written by applying a pressure P where $P_c<P<P_p$.

The polymer dispersion has three functions: to support the substrates keeping them from delaminating from a negatively applied force, to keep the top conductor from touching the bottom conductor from a positively applied force and to restrict the flow of cholesteric liquid crystal such that sharp lines and high contrast are possible. In all embodiments of the invention the image is bistable in that no electric field is needed to maintain the image on the display, including gray scale images.

What is claimed is:

1. A multicolor writing tablet comprising:
   electrically conductive layers;
   at least two active layers stacked over each other, each disposed in a gap between adjacent electrically conductive layers, said active layers including bistable cholesteric liquid crystal material;
   an outer layer of flexible transparent material forming a writing surface;
   a light absorbing back layer adapted to absorb light passing through said active layers;
   wherein said active layers are adapted to enable writing pressure applied to said writing surface to reduce thickness of said gaps to form reduced gap regions;
   electronic circuitry for applying erasing and writing voltages to said electrically conductive layers for each of said active layers;
   wherein said erasing voltage is a voltage that enables said liquid crystal material of said active layers to be placed in a planar texture reflecting light of a predetermined color or a different erasing voltage that enables said liquid crystal material of said active layers to be placed in an essentially transparent focal conic texture; and
   wherein said writing voltage enables writing on said tablet in a color selected from any of said active layers by applying said writing voltage to said electrically conductive layers for a non-selected active layer while applying said writing pressure to said writing surface, enabling said reduced gap region of said non-selected active layer to be in said essentially transparent focal conic texture and by not applying said writing voltage to said electrically conductive layers for a selected active layer while applying said writing pressure to said writing surface, enabling said reduced gap region of said selected active layer to be in said planar texture reflecting light of a predetermined color.

2. The writing tablet of claim 1 comprising an untethered stylus adapted to apply said writing pressure.

3. The writing tablet of claim 1 wherein said conductive layers are patterned or unpatterned.

4. The writing tablet of claim 1 wherein said liquid crystal is dispersed in a polymer matrix.

5. The writing tablet of claim 1 comprising a single flexible substrate or a substrate component between adjacent said active layers, wherein said single substrate includes said conductive layers on both sides thereof while said substrate component includes two flexible transparent substrates having said conductive layers on outside surfaces thereof and index of refraction matching material disposed between said substrates.

6. The writing tablet of claim 1 wherein all of said electrically conductive layers are transparent except for one of said electrically conductive layers closest to said light absorbing layer which is transparent or opaque.

7. The writing tablet of claim 1 further comprising a touch screen layer for capturing said writing on said tablet for storage in a storage device.

8. The writing tablet of claim 7 wherein said touch screen layer is optically transparent.

9. The writing tablet of claim 7 wherein said touch screen layer is a capacitive touch screen layer.

10. The writing tablet of claim 1 wherein said tablet is adapted for detecting said reduced gap regions for capturing said writing on said tablet for storage in a storage device.

11. The writing tablet of claim 1 further comprising a capacitive transparent touch screen layer for capturing said writing on said tablet for storage in a storage device.

12. A method of forming a multicolor image on a writing tablet, comprising:
    providing a writing tablet including electrically conductive layers, at least two active layers stacked over each other each disposed in a gap between adjacent electrically conductive layers, said active layers including bistable cholesteric liquid crystal material, an outer layer of flexible transparent material forming a writing surface and a light absorbing back layer adapted to absorb light passing through said active layers, said back layer being a back color or black, wherein said active layers are adapted to enable writing pressure applied to said writing surface to reduce thickness of said gaps to form reduced gap regions;
    selecting initial states by applying an erasing voltage to said electrically conductive layers effective to place each said active layer in a planar texture reflecting light of a predetermined color or by applying a different erasing voltage to said electrically conductive layers effective to place said active layer in an essentially transparent focal conic texture; and then
    writing at a selected color by applying said writing pressure to said writing surface while applying a writing voltage to said conductive layers for a non-selected active layer enabling said reduced gap region of said non-selected active layer to be in said essentially transparent focal conic texture and by not applying said writing voltage to said conductive layers for a selected active layer while applying said writing pressure to said writing surface, enabling said reduced gap region of said selected active layer to be in said planar texture reflecting light of a predetermined color.

13. The method of claim 12 wherein said conductive layers are patterned or unpatterned.

14. The method of claim 12 comprising changing said writing pressure effective to enable said reduced gap region of said selected active layer to be at a gray scale level of reflectivity between a minimum level of reflectivity of said focal conic texture and a maximum level of reflectivity of said planar texture.

15. The method of claim 12 comprising two of said active layers, said selection of said initial states of said active layers being selected from the group consisting of:
    1) both of said active layers in said planar texture,
    2) both of said active layers in said focal conic texture, and
    3) one of said active layers in said focal conic texture and the other of said active layers in said planar texture.

16. The method of claim 15 wherein a background in unreduced gap regions of said active layers is selected from the group consisting of:
    4) black or said back color when said initial states 2) are selected;
    5) a color of said initial planar texture of said active layer when said initial states 3) are selected;
    6) a color that is an additive mixture of colors reflected by said initial planar textures of both of said active layers when said initial states 1) are selected, and
    7) a color that is an additive mixture of said back color and said color 5) or of said back color and said color 6).

17. The method of claim 16 whereby said tablet displays a written portion that is i) a color reflected by said selected layer in said reduced gap region thereof or ii) an additive mixture of said color i) and said back color.

18. The method of claim 7 comprising three of said active layers, said selection of said initial states of said active layers being selected from the group consisting of:
    1) all three of said active layers in said planar texture,
    2) all three of said active layers in said focal conic texture,
    3) one of said active layers in said focal conic texture and two of said active layers in said planar texture, and
    4) one of said active layers in said planar texture and two of said active layers in said focal conic texture.

19. The method of claim 18 wherein a background in unreduced gap regions of said active layers is selected from the group consisting of:
    5) black or said back color when said initial states 2) are selected;
    6) a color of said initial planar texture active layer when said initial states 4) are selected;
    7) a color that is an additive mixture of both of said initial planar texture active layers when said initial states 3) are selected or is an additive mixture of all three of said initial planar texture active layers when said initial states 1) are selected, and
    8) a color that is an additive mixture of said back color and said color 7) or 6).

20. The method of claim 18 wherein pitch lengths of chiral additives of said cholesteric liquid crystal of said active layers are selected such that each of said active layers reflects a different one of red, green and blue in any sequence.

21. The method of claim 12 comprising selecting said selected color by applying said writing pressure to said writing surface while applying said writing voltage to said conductive layers enabling said reduced gap region of two of said non-selected said active layers to be in said essentially transparent focal conic texture and said reduced gap region of said selected active layer to include said planar texture, whereby said tablet displays a written portion that is i) a color reflected by said selected layer in said reduced gap region thereof or ii) an additive mixture of said color i) and said back color.

22. The method of claim 12 comprising selecting said selected color by applying said writing pressure to said writing surface while applying said writing voltage to said conductive layers enabling said reduced gap region of said non-selected said active layer to be in said essentially transparent focal conic texture and said reduced gap region of two of said selected active layers to include said planar texture, whereby said tablet displays a written portion that is i) a color that is an additive mixture of two colors reflected by said planar textures of said two selected active layers or ii) an additive mixture of said color i) and said back color.

23. The method of claim 12 wherein said liquid crystal is dispersed in a polymer matrix.

24. The method of claim 12 wherein said step of writing at a selected color is carried out on said writing tablet that already includes an image.

25. The method of claim 12 wherein all of said electrically conductive layers are transparent except for one of said electrically conductive layers closest to said light absorbing layer which is transparent or opaque.

26. A method of forming a multicolor image on a writing tablet comprising:
providing a writing tablet including electrically conductive layers, at least two active layers stacked over each other each disposed in a gap between adjacent electrically conductive layers, said active layers including bistable cholesteric liquid crystal material, an outer layer of flexible transparent material forming a writing surface and a light absorbing back layer adapted to absorb light passing through said active layers, said back layer being a back color or black, wherein said active layers are adapted to enable writing pressure applied to said writing surface to reduce thickness of said gaps to form reduced gap regions;
selecting initial states by applying an erasing voltage to said electrically conductive layers effective to place said active layer in a planar texture reflecting light of a predetermined color or by applying a different erasing voltage to said electrically conductive layers effective to place said active layer in a transparent focal conic texture; and then
writing at a selected color by applying said writing pressure to said writing surface while applying a writing voltage to said electrically conductive layers for a non-selected active layer enabling said reduced gap region of said non-selected active layer to be at a gray scale level of reflectivity between a minimum level of reflectivity of said focal conic texture and a maximum level of reflectivity of said planar texture and by not applying said writing voltage to said electrically conductive layers for a selected active layer while applying said writing pressure to said writing surface, enabling said reduced gap region of said selected active layer to be in said planar texture reflecting light of a predetermined color.

27. A method of forming an image on a writing tablet, comprising:
providing a writing tablet including electrically conductive layers, an active layer disposed in a gap between adjacent electrically conductive layers, said active layer including bistable cholesteric liquid crystal material, an outer layer of flexible transparent material forming a writing surface and a light absorbing layer adapted to absorb light passing through said active layer, wherein said active layer is adapted to enable writing pressure applied to said writing surface to reduce a thickness of said gap in a reduced gap region;
applying an erasing voltage to place said active layer in an initial texture reflecting light of a color; and
applying said writing pressure while applying a writing voltage to said electrically conductive layers effective to place said reduced gap region of said active layer in an essentially transparent focal conic texture while not changing said texture of an unreduced gap region of said active layer.

28. The method of claim 27 wherein said light absorbing layer is a back color or black, and said writing tablet is said back color or black in said reduced gap region and has a background in said unreduced gap region that is said a color reflected by said initial texture reflecting light of said color of said active layer or an additive mixture of said back color and said color.

29. The method of claim 27 wherein said liquid crystal is dispersed in a polymer matrix.

30. A method of forming an image on a writing tablet, comprising:
providing a writing tablet including electrically conductive layers, an active layer disposed in a gap between adjacent electrically conductive layers, said active layer including bistable cholesteric liquid crystal material, an outer layer of flexible transparent material forming a writing surface and a light absorbing layer adapted to absorb light passing through said active layer, wherein said active layer is adapted to enable writing pressure applied to said writing surface to reduce a thickness of said gap in a reduced gap region;
applying an erasing voltage to said electrically conductive layers of said active layer, said erasing voltage being a voltage that places said active layer in an initial texture reflecting light of a color or a different erasing voltage that places said active layer in an initial essentially transparent focal conic texture; and
applying said writing pressure while applying a writing voltage to said electrically conductive layers effective to place said reduced gap region of said active layer in an essentially transparent focal conic texture while not changing said texture of an unreduced gap region of said active layer;
further comprising an additional active layer stacked above or below said active layer in a gap between adjacent electrically conductive layers, comprising placing said additional active layer in said initial texture, wherein while said writing pressure is applied said writing voltage is applied to said electrically conductive layers for said active layer alone or for said active layer and said additional active layer.

31. The method of claim 30 wherein all of said electrically conductive layers are transparent except for one of said electrically conductive layers closest to said light absorbing layer which is transparent or opaque.

32. A writing tablet comprising:
electrically conductive layers;
at least two active layers stacked over each other each disposed in a gap between adjacent electrically conductive layers, said active layers including bistable cholesteric liquid crystal material having reflective wavelengths that when in a planar texture together reflect white light;
an outer layer of flexible transparent material forming a writing surface;
a light absorbing black back layer adapted to absorb light passing through said active layers;

wherein said active layers are adapted to enable writing pressure applied to said writing surface to reduce thickness of said gaps to form reduced gap regions;

electronic circuitry for applying an erasing voltage to said electrically conductive layers for each of said active layers;

wherein said erasing voltage enables said liquid crystal material of all of said active layers to be placed in an essentially transparent focal conic texture that displays said black back layer; and wherein said tablet is written in white by applying no writing voltage to any of said electrically conductive layers while applying said writing pressure to said writing surface, enabling said reduced gap region of all of said active layers to be in said planar texture which together reflects white light.

33. The writing tablet of claim 32 comprising at least three of said active layers each reflecting one of red, green and blue in any order.

34. A writing tablet comprising:

electrically conductive layers;

at least two active layers stacked over each other each disposed in a gap between adjacent electrically conductive layers, said active layers including bistable cholesteric liquid crystal material having reflective wavelengths that when in a planar texture together reflect white light;

an outer layer of flexible transparent material forming a writing surface;

a light absorbing black back layer adapted to absorb light passing through said active layers;

wherein said active layers are adapted to enable writing pressure applied to said writing surface to reduce thickness of said gaps to form reduced gap regions;

electronic circuitry for applying erasing and writing voltages to said electrically conductive layers for each of said active layers;

wherein said erasing voltage enables said liquid crystal material of all of said active layers to be placed in a planar texture so as to together reflect white light; and wherein said writing tablet is written in black by applying said writing voltage to said electrically conductive layers for all of said active layers while applying said writing pressure to said writing surface, enabling said reduced gap region of all of said active layers to be in an essentially transparent focal conic texture thereby displaying said black back layer.

35. The writing tablet of claim 34 comprising at least three of said active layers each reflecting one of red, green and blue in any order.

* * * * *